US012368358B2

(12) United States Patent
Heenan et al.

(10) Patent No.: US 12,368,358 B2
(45) Date of Patent: Jul. 22, 2025

(54) APPARATUS FOR USE WITH ELECTROCHEMICAL CELLS

(71) Applicant: Gaussion Ltd, London (GB)

(72) Inventors: Thomas Heenan, London (GB); Chun Tan, London (GB)

(73) Assignee: Gaussion Ltd, London (GB)

( * ) Notice: Subject to any disclaimer, the term of this patent is extended or adjusted under 35 U.S.C. 154(b) by 0 days.

(21) Appl. No.: 18/620,168

(22) Filed: Mar. 28, 2024

(65) Prior Publication Data
US 2024/0333116 A1    Oct. 3, 2024

(30) Foreign Application Priority Data
Mar. 29, 2023    (GB) ..................... 2304619

(51) Int. Cl.
*H01M 10/00* (2006.01)
*H01M 10/42* (2006.01)
*H01M 10/44* (2006.01)
*H01M 10/48* (2006.01)
*H01M 50/204* (2021.01)
*H02K 21/02* (2006.01)

(52) U.S. Cl.
CPC ...... *H02K 21/028* (2013.01); *H01M 10/4207* (2013.01); *H01M 10/446* (2013.01); *H01M 10/482* (2013.01); *H01M 50/204* (2021.01); *H01M 2010/4271* (2013.01)

(58) Field of Classification Search
CPC ............ H02K 21/028; H01M 10/4207; H01M 10/482; H01M 50/204; H01M 10/446; H01M 2010/4271
See application file for complete search history.

(56) References Cited

U.S. PATENT DOCUMENTS

| 2004/0108203 | A1 | 6/2004 | Sullivan | |
| 2016/0261008 | A1* | 9/2016 | Stefani | H01M 10/39 |
| 2022/0093981 | A1* | 3/2022 | Heenan | H02J 7/12 |
| 2022/0109329 | A1* | 4/2022 | Sakai | H01M 50/247 |

FOREIGN PATENT DOCUMENTS

| CN | 112397737 A | 2/2021 |
| DE | 102008053407 A1 | 4/2010 |
| GB | 2617438 A | 10/2023 |
| KR | 10-1963326 B1 | 3/2019 |
| WO | 2008/146188 A2 | 12/2008 |
| WO | 2020/144142 A1 | 7/2020 |

OTHER PUBLICATIONS

International Search Report and Written Opinion received for PCT Patent Application No. PCT/EP2024/058373, mailed on Jun. 26, 2024, 12 pages.
Luo et al., "Electrochemistry in Magnetic Fields", Angewandte Chemie, 2022, vol. 61, No. 27, 22 pages.
Office Action received for Great Britain Patent Application No. 2304619.6, mailed on Jun. 7, 2023, 5 pages.

* cited by examiner

*Primary Examiner* — Nicholas P D'Aniello
(74) *Attorney, Agent, or Firm* — ArentFox Schiff LLP

(57) ABSTRACT

The present invention provides an apparatus for homogenising one or more regions within a plurality of electrochemical cells, the apparatus comprising a plurality of magnetic flux generators, each configured to generate a respective changing magnetic field through at least one of the plurality of electrochemical cells, wherein the plurality of magnetic flux generators and the plurality of electrochemical cells are arranged in an alternating manner.

20 Claims, 22 Drawing Sheets

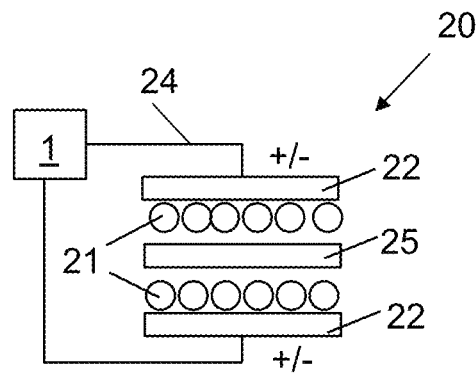
FIG. 19
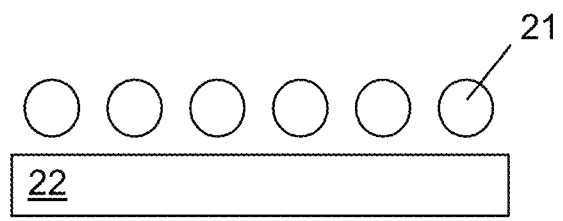
FIG. 20A
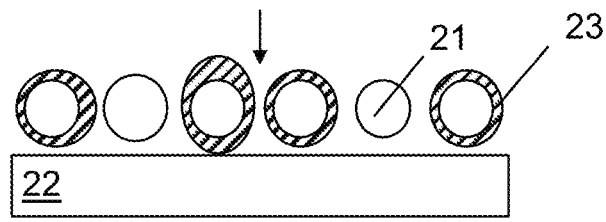
FIG. 20B
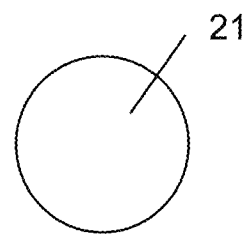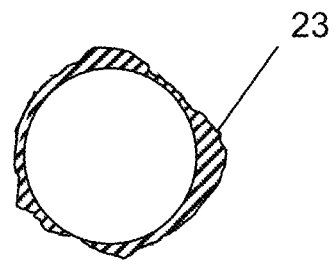
FIG. 21A  FIG. 21B

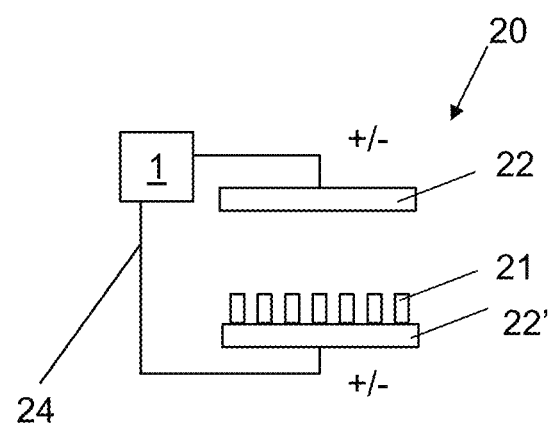
FIG. 22
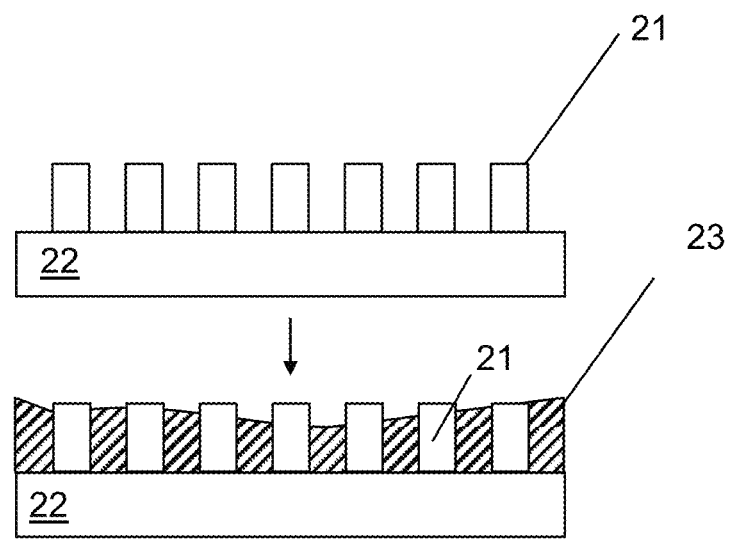
FIG. 23A
FIG. 23B

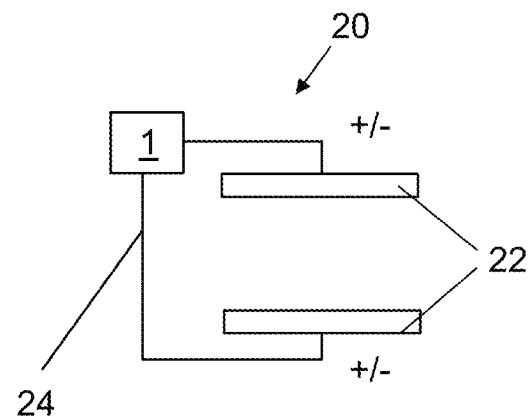
FIG. 24
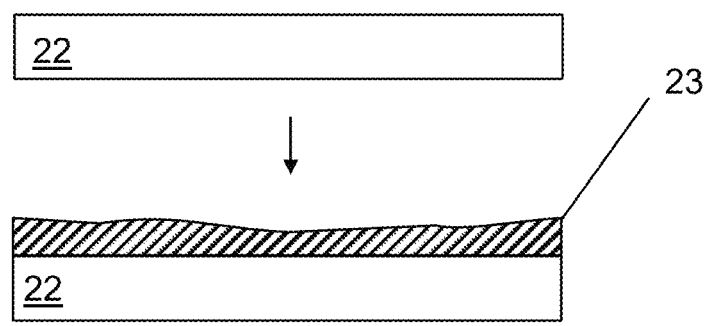
FIG. 25A
FIG. 25B

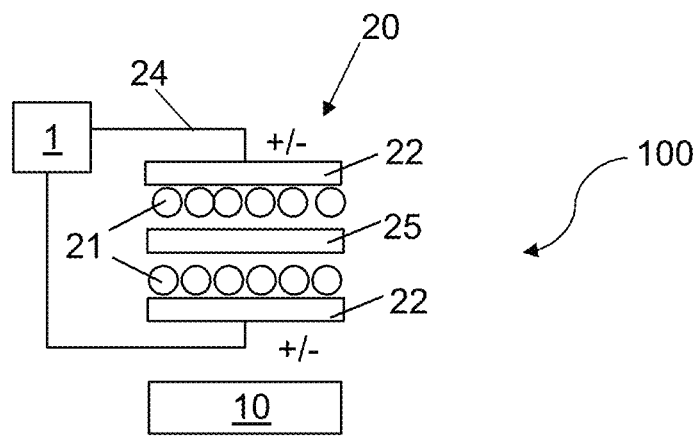
FIG. 26
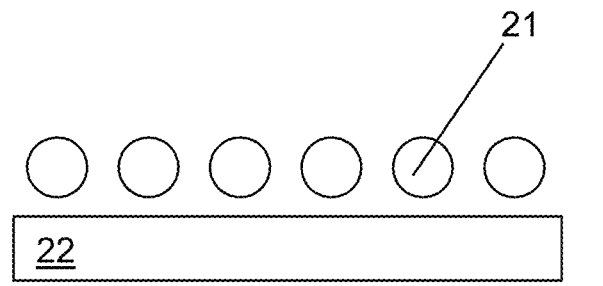
FIG. 27A
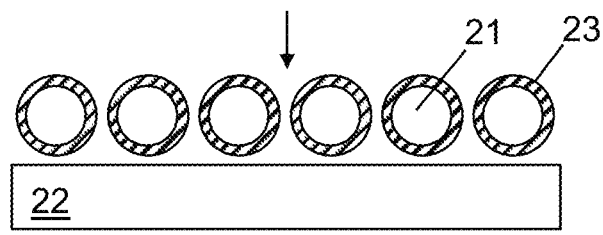
FIG. 27B
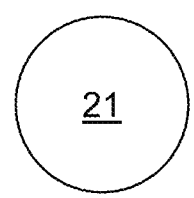  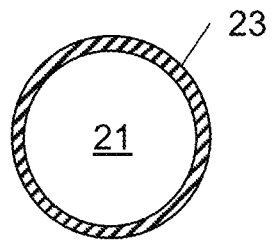
FIG. 28A                    FIG. 28B

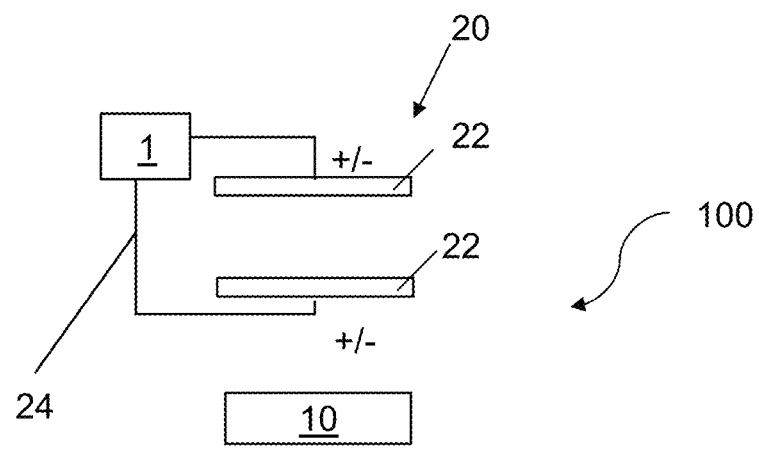
FIG. 31
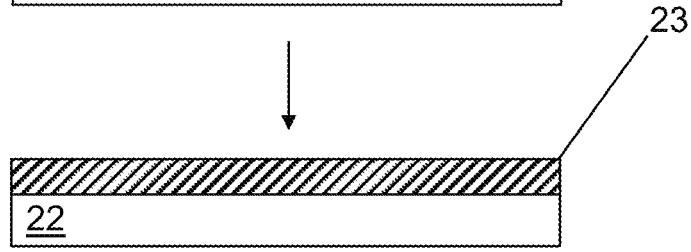

APPARATUS FOR USE WITH ELECTROCHEMICAL CELLS

CROSS-REFERENCE TO RELATED APPLICATION

This application claims foreign priority to GB Patent Application No. 2304619.6, entitled "APPARATUS FOR USE WITH ELECTROCHEMICAL CELLS", filed on Mar. 29, 2023, which is expressly incorporated by reference herein in its entirety.

FIELD OF THE INVENTION

The present invention relates to an apparatus for homogenising one or more regions within a plurality of electrochemical cells.

BACKGROUND

Electrochemical cells are vital to many electrical systems, including portable devices such as mobile phones, laptops and electric vehicles, as well as stationary devices and systems such as stationary home energy storage.

Various types and configurations of electrochemical cells can be selected based on size, shape, voltage, current and other requirements. Examples of common shapes of cells include pouch cells, prismatic cells, cylindrical cells, and coin cells. The cells may also be connected in series or in parallel arrangements forming a battery to provide the appropriate voltage and/or current for the application.

In general, it is desirable for cells to have a large capacity and a short charging time to increase the ratio of time that the devices can operate independently of an external power source to time that they must be connected to an external power source for charging.

The performance and/or lifetime of electrochemical cells is linked to the quality of their structure. Specifically, heterogeneous structure (e.g. resulting from heterogeneous layer deposition/removal during cell formation and/or cell operation) can impair the cell's performance and/or longevity. Electrochemical cells (such as Li-ion cells) typically have a layered structure including for example interfacial layers acting to passivate electrochemically active interfacial surfaces within the cell. Layers are typically deposited/removed during cell formation and/or cell operation under electrochemistry conditions. However, reliably controlling the homogeneity of layer structure under these conditions can be challenging. It is known that the quality of the cells' layer structure can dramatically impact cell performance as well as the feasibility and economics of an electrochemical process. For example, in the context of Li-ion cells it is imperative that interfacial layer formation during cell formation (i.e. during Formation Aging & Testing (FA&T)) and during cell operation is reliably controlled to ensure safe and efficient cell operation.

Therefore, as the quality of cells' internal structure can dramatically impact their performance and/or lifetime, it is important to be able to reliably control the homogeneity of regions within the cells during cell formation and/or cell operation.

The present invention has been devised in light of the above considerations.

SUMMARY OF THE INVENTION

In a first aspect, the present invention provides an apparatus for homogenising one or more regions within a plurality of electrochemical cells, the apparatus comprising:

a plurality of magnetic flux generators, each configured to generate a respective changing magnetic field through at least one of the plurality of electrochemical cells;

wherein the plurality of magnetic flux generators and the plurality of electrochemical cells are arranged in an alternating manner.

Thus, the present apparatus is configured to homogenise one or more regions within each cell of a plurality of electrochemical cells by ensuring that layer deposition/removal (during cell formation and/or operation) is performed under magneto-electrochemistry conditions. This is achieved through the provision of a respective changing magnetic field through (i.e. permeating) each cell. Advantageously, the provision of a changing magnetic field through an electrochemical cell increases the homogeneity of local resistances within the cell, thereby increasing the homogeneity of layers within the cell (e.g. the solid-electrolyte-interface (SEI)). Furthermore, layer deposition/removal under magneto-electrochemistry can also increase formation/removal speed of the layers. Thus, the present apparatus ensures that one or more regions within the plurality of cells can be homogenised during cell formation and/or cell operation thereby enhancing the cells' performance, and optionally, layers can be formed/removed faster.

Furthermore, the apparatus may be configured such that spatial and/or temporal relations between the plurality of magnetic flux generators are controlled to prevent destructive interference of the plurality of respective changing magnetic fields. The desired spatial and/or temporal relations can be modelled using known computational techniques.

Optional features of the invention are discussed below. The invention includes the combination of the aspects and optional features described except where such a combination is clearly impermissible or expressly avoided.

The/each electrochemical cell may be a battery. The/each electrochemical cell may be a positive ion battery and the current flow path may be the direction of travel of positive ions. Alternatively, the/each electrochemical cell may be a negative ion battery and the current flow path may be the direction of travel of negative ions. The/each electrochemical cell may be a lithium-ion battery. The/each electrochemical cell may be a solid-state battery.

Optionally, the changing magnetic field produced by at least one of the one or more magnetic flux generators may have a frequency of at least 0.1 Hz, or at least 1 Hz, or at least 5 Hz, or at least 10 Hz, or at least 20 Hz or at least 50 Hz, or at least 75 Hz, or at least 100 Hz, or at least 125 Hz. Alternatively, or in addition, the changing magnetic field produced by at least one of the one or more magnetic flux generators may have a frequency of 1000 Hz or less, 750 Hz or less, 500 Hz or less, or 250 Hz or less, or 150 Hz or less, or 100 Hz or less.

Optionally the apparatus may comprise one or more cell stations, each configured to contain a respective plurality of the electrochemical cells. Each cell station may comprise a cell tray and/or a cell container to support the respective plurality of electrochemical cells. For example, the/each cell tray/cell container may be formed of magnetically susceptible materials to direct the magnetic fields towards preferred locations, e.g. localising and isolating the field to the/each cell tray/cell container to maximise control of the field structure and minimise stray magnetic field losses to the local environment.

Optionally the plurality of magnetic flux generators may be arranged inside the/each cell station such that the/each cell station comprises at least one of the plurality of magnetic flux generators. When the magnetic flux generators are arranged inside the/each cell station and each cell station comprises a respective cell tray and/or cell container, the magnetic flux generators may be also supported by the respective cell tray and/or cell container.

Optionally the/each cell station may comprise at least as many magnetic flux generators as electrochemical cells. Optionally the magnetic flux generators and the electrochemical cells in the/each cell station may be arranged in an alternating manner. For example, the magnetic flux generators and the electrochemical cells in the/each cell station may be arranged such that each cell is sandwiched between a respective pair of magnetic flux generators and vice versa. Conveniently, this can ensure that the electrochemical cells within each cell station are uniformly permeated by a respective changing magnetic field.

Optionally the one or more cell stations may be a plurality of cell stations. The cell stations may be arranged in a grid/array and/or may be stacked such that they are vertically aligned. Conveniently, this allows the cell stations to be arranged (e.g. shelved into towers) in larger-scale cell manufacturing facilities (e.g. giga factories) and/or in stationary home energy storage to simultaneously expose large numbers of electrochemical cells to a changing magnetic field to realise the advantageous effects of the present invention.

Optionally the plurality of magnetic flux generators may be interspersed among the plurality of cell stations. Optionally the magnetic flux generators and the cell stations may be arranged such that each cell station is sandwiched between a respective pair of the plurality of magnetic flux generators. Conveniently, this can ensure that the electrochemical cells within each cell station are uniformly permeated by a respective changing magnetic field.

Optionally the plurality of cell stations may be contained inside a container, the container having one or more walls, and at least one of the plurality of magnetic flux generators may be arranged external to the container and adjacent to a respective one of the one or more walls of the container. For example, the/each magnetic flux generator may abut a respective wall of the container, or, the/each magnetic flux generator may be adjacent to a respective wall of the container such that it extends along a plane substantially parallel to and closely spaced from a wall of the container.

Optionally the apparatus may comprise at least one electrical power source configured to supply electrical power to the plurality of electrochemical cells. When the apparatus comprises a plurality of cell stations, the at least one electrical power source may be a plurality of electrical power sources, each being configured to supply electrical power to the electrochemical cells in a respective one of the plurality of cell stations. Such a configuration can ensure that the power requirements of the different cell stations are independent of one another, thereby improving controllability of the process of homogenising one or more regions within the plurality of electrochemical cells.

Optionally the at least one electrical power source may be further configured to supply electrical power to the plurality of magnetic flux generators.

Optionally each magnetic flux generator may be connected to a shared or a respective power supply to receive electrical power therefrom, the shared or each respective power supply being distinct from the at least one electrical power source. Providing a shared or respective power supply for each magnetic flux generator, which is distinct from the at least one electrical power supply can conveniently ensure that the power requirements of the electrochemical cells are independent from those of the magnetic flux generators. This can improve controllability of the generated changing magnetic fields.

Optionally when each magnetic flux generator may be connected to the shared power supply, subsets of the plurality of magnetic flux generators being each connected to the shared power supply via a respective shared electrical connection.

Optionally each changing magnetic field may be one of or any combination of: rotating, pulsed, and/or oscillating. Rotation of each changing magnetic field may be around an axis having a component perpendicular to a direction of the respective changing magnetic field. The rotation of each changing magnetic field may be around an axis having a component parallel to a direction of the respective changing magnetic field. Rotation of each changing magnetic field may be around an axis having a component perpendicular to a direction of current flow within each electrochemical cell. The rotation of each changing magnetic field may be around an axis having a component parallel to a direction of current flow of each electrochemical cell. Each rotating magnetic field may be provided by a rotating permanent magnet, or a temporary magnet, or an electromagnet or may be provided by an array of electromagnets which are sequentially activated to effectively rotate the respective magnetic field.

Optionally each changing magnetic field may be controllably variable in one, two, or three spatial dimensions. Additionally, or alternatively, the polarity and/or magnitude of each magnetic field may be controllably variable.

Optionally each magnetic flux generator may comprise one or more magnetic field sources.

Optionally at least one of the one or more magnetic field sources may comprise a permanent magnet and a respective mechanism for moving the permanent magnet and/or one or more of the electrochemical cells. For example, the mechanism may be an electric motor. Generally, when the changing magnetic field is produced by moving the permanent magnet, it may be varied by varying the direction and/or speed at which the permanent magnet is moved by the respective mechanism. To completely "switch off" the transient nature of a permanent magnet, it is kept static. When the apparatus comprises a controller as described below, the controller may be configured to control the mechanism (e.g. the electric motor) so as to control characteristics (e.g. frequency and/or direction) of the changing magnetic fields produced by the magnetic flux generators.

Optionally at least one of the one or more magnetic field sources may be an electromagnet. The electromagnet may be any type of electromagnet. The electromagnet generally comprises a coil of wire wound around a core. The core may be formed of a high-permeability magnetic material. The core may be a metal core (e.g. a ferromagnetic core). Alternatively, the core may be an air-filled space at the centre of the electromagnet, i.e. an air core. Each electromagnet may be coupled to a shared or respective power supply as discussed above. The magnetic field produced by each electromagnet may be varied by varying the amount of electrical power and/or the direction of the electrical current supplied thereto by the power supply. For example, it may be desirable to switch one or more of the electromagnets off (i.e. supply no power to them) to vary the changing magnetic field produced by the respective magnetic flux generator. Additionally, or alternatively, it may be desirable to provide electrical current having different directions and/or magnitudes to respective different electromagnets e.g. to vary the magnetic polarity of the respective generated magnetic fields.

When the apparatus comprises a controller as described below, the controller may be configured to control electrical current supplied to the magnetic flux generators so as to control characteristics of the produced changing magnetic fields. In some examples, the controller may be configured to control the amount of electrical power and/or the direction and/or the frequency of the electrical current supplied to the one or more magnetic flux generators by the/each power supply, and/or switch off supply of power to selected one(s) of the magnetic flux generators. In some examples, the controller may be configured to cause the/each power supply to supply electrical current having different directions and/or magnitudes and/or frequencies to selected one(s) of the magnetic flux generators (in this case, electromagnets).

Optionally each electromagnet may be an air-core electromagnet longitudinally (i.e. axially) and radially extending to define a space for accommodation of a respective one of the plurality of electrochemical cells. The electrochemical cells may be cylindrical. By air-core electromagnet, here it is a meant a coil of wire (i.e. solenoid) which comprises a central air-filled space defined by the coil and does not comprise a solid core, such as a ferromagnetic core. When the one or more magnetic field sources is a plurality of magnetic field sources, each magnetic flux generator may be provided by stacking the plurality of air-core electromagnets to provide a shared air core common to all air-core electromagnets. The air core/the shared air core may accommodate a respective electrochemical cell, e.g. a cylindrical cell.

At least one of the plurality of magnetic flux generators may be a curved magnetic flux generator. The/each curved magnetic flux generator may be curved to at least partially surround an electrochemical cell of the plurality of electrochemical cells. That is, the/each curved magnetic flux generator may be shaped and sized to at least partially curve around a curved portion of an electrochemical cell, such as a cylindrical cell. For example, the/each curved magnetic flux generator may comprise at least one curved portion (i.e. bend) shaped and sized to curve around a curved portion of an electrochemical cell, and optionally at least one flat (planar) portion.

When the/each curved magnetic flux generator comprises a plurality of magnetic field sources, the plurality of magnetic field sources may be arranged around a curve, arc, circle, or a polygon to provide the curved portion of the curved magnetic flux generator. The curve, arc, circle, or polygon may be respectively provided by a curved, semi-circular, circular, or polygonal mechanical support.

Alternatively, when each magnetic flux generator comprises a plurality of magnetic field sources, the plurality of magnetic field sources may be arranged in a common plane. A magnetic flux generator comprising a plurality of magnetic field sources arranged in a common plane is referred to as a flat (planar) magnetic flux generator. The flat magnetic flux generator may be provided by a single magnetic field source which is a flat permanent magnet.

At least some of the plurality of magnetic flux generators may be flat magnetic flux generators. When the apparatus comprises one or more cell stations, at least some of the magnetic flux generators may be provided external to the cell station(s) (e.g. external to the cell container(s)). Additionally, or alternatively, at least some of the magnetic flux generators may be arranged inside the/each cell station e.g. as discussed in more detail above. Conveniently, when some magnetic flux generators are provided external to the cell station(s) and some magnetic flux generators are provided inside the cell station(s), it can be ensured that the cell stations(s) are uniformly permeated by the generated changing magnetic fields.

In some examples, the apparatus comprises one or more cell stations as discussed above, and one or more flat magnetic flux generators positioned external to cell station(s), and one or more magnetic flux generators arranged inside the cell station(s). For example, where the/each cell station comprises a cell container, the/each flat magnetic flux generator may abut a respective wall of the cell container, or, the/each flat magnetic flux generator may be adjacent to a respective wall of the cell container such that it extends along a plane substantially parallel to and closely spaced from a wall of the cell container. The/each magnetic flux generator arranged inside a cell station may comprise for example a single electromagnet.

As already mentioned above, the apparatus further may comprise a controller configured to control the changing magnetic fields produced by the plurality of magnetic flux generators. For example, the controller may be configured to control (e.g. vary over time) a direction and/or magnitude and/or frequency of the generated changing magnetic fields. The controller may be configured to control each changing magnetic field (e.g. by selecting a value for one or more of the three spatial dimensions, and/or the magnitude and/or the phase and/or the amplitude and/or the frequency of the/each changing magnetic field) based on any one of or any combination of electric, magnetic, optical, and/or acoustic measurements performed on one or more of the plurality of electrochemical cells. The electric, magnetic, optical, and/or acoustic measurements may be performed as each changing magnetic field is individually controllably varied. The apparatus may comprise a sensor unit configured to perform the electric, magnetic, optical, and/or acoustic measurements. For example, the sensor unit may comprise any one or any combination of Hall, Gauss, optical, and/or acoustic sensors. The controller may be communicatively connected to the sensor unit.

Optionally the controller may be configured to:
  monitor electrochemical overpotential of each of the plurality of electrochemical cells as each of the plurality of changing magnetic fields is varied; and
  select an optimal value for each changing magnetic field to minimize each electrochemical overpotential.

The monitoring may be discrete or continuous. Additionally, the controller may select an optimal value for any one or any combination of the polarity, magnitude, phase, amplitude, and/or frequency of each changing magnetic field to minimize the electrochemical overpotential. The controller may repeat the monitoring of each electrochemical overpotential and the selection of optimal values as many times as required to minimize each electrochemical overpotential.

The controller may be configured to monitor each electrochemical overpotential via direct overpotential measurements. The direct overpotential measurements may be performed for example using electrochemical impedance spectroscopy (with electrical impedance measurements at multiple frequencies (spectroscopy) or at a fixed-frequency). Alternatively, any one or any combination of the amplitude, phase shift, and frequency of the/each cell's electrochemical potential or electrical current may be measured to monitor the electrochemical overpotential.

The controller may be configured to monitor each electrochemical overpotential using any one of or any combination of electric, magnetic, optical, acoustic measurements performed on the plurality of electrochemical cells. For example, such measurements may be used as a proxy for determining the electrochemical overpotential of each electrochemical cell. The controller may be electrically connected to each of the magnetic flux generators and to each of the electrochemical cells.

When the controller is configured to monitor each electrochemical overpotential using any one of or any combination of electric, magnetic, optical, acoustic measurements performed on the plurality of electrochemical cells, the controller may be electrically connected to each magnetic flux generator and to each electrochemical cell, and additionally communicatively connected to the sensor unit configured to perform the electric, magnetic, optical, and/or acoustic measurements. For example, the sensor unit may comprise any one or any combination of Hall, Gauss, optical, and/or acoustic sensors. This is because electric, magnetic, optical, acoustic measurements can be indicative of the state of charge/health of an electrochemical cell. For example, the optical sensors may be configured to measure deformation and/or build-up/loss of material at selected locations on the electrochemical cells. The acoustic sensors may be configured to measure decibel response to acoustic signals transmitted to/reflected from one or more selected locations on the electrochemical cells. Conveniently, the decibel response correlates to the state of charge at a selected location on the electrochemical cells.

In a second aspect, the present invention provides a method of homogenising one or more regions within a plurality of electrochemical cells, the method comprising the steps of:
  providing a plurality of magnetic flux generators;
  arranging the plurality of magnetic flux generators and the plurality of electrochemical cells in an alternating manner; and
  generating by one or more of the magnetic flux generators a respective changing magnetic field through at least one of the plurality of electrochemical cells.

In a third aspect, the present invention provides apparatus for homogenising one or more regions within a plurality of electrochemical cells, the apparatus comprising:
  a plurality of magnetic flux generators, each configured to generate a respective magnetic field through at least one of the plurality of electrochemical cells;
  wherein the plurality of magnetic flux generators and the plurality of electrochemical cells are arranged in an alternating manner.

SUMMARY OF THE FIGURES

Embodiments and experiments illustrating the principles of the invention will now be discussed with reference to the accompanying figures in which:

FIG. 19 schematically shows an electrochemical cell connected to an electrical circuit;

FIGS. 20A-20B show a current collector and an electrode of the electrochemical cell of FIG. 19 respectively before and after the deposition of an interfacial layer;

FIGS. 21A-21B schematically show an electrode particle of the electrode of FIGS. 20A-20B respectively before and after the deposition of the interfacial layer;

FIG. 22 schematically shows a variant of an electrochemical cell connected to an electrical circuit;

FIGS. 23A-23B show a current collector and an electrode of the electrochemical cell of FIG. 22 respectively before and after the deposition of an interfacial layer;

FIG. 24 schematically shows a variant of an electrochemical cell connected to an electrical circuit;

FIGS. 25A-25B show a current collector and an electrode of the electrochemical cell of FIG. 24 respectively before and after the deposition of an interfacial layer;

FIG. 26 schematically shows a configuration comprising an electrochemical cell and a magnetic flux generator;

FIGS. 27A-27B schematically show a current collector and an electrode of the electrochemical cell of FIG. 26 respectively before and after the deposition of an interfacial layer;

FIGS. 28A-28B schematically show an electrode particle of the electrode of FIGS. 27A-27B respectively before and after the deposition of the interfacial layer;

FIG. 31 schematically shows a configuration comprising an electrochemical cell and a magnetic flux generator; and FIGS. 32A-32B schematically show a current collector and an electrode of the electrochemical cell of FIG. 31 respectively before and after the deposition of an interfacial layer.

DETAILED DESCRIPTION OF THE INVENTION

Aspects and embodiments of the present invention will now be discussed with reference to the accompanying figures. Further aspects and embodiments will be apparent to those skilled in the art. Specifically, it will be apparent to those skilled in the art that other orientations of features shown in the figures are possible. The figures are schematic and not necessarily to scale.

According to the present invention, there is provided an apparatus for homogenising one or more regions within a plurality of electrochemical cells. The apparatus comprises a plurality of magnetic flux generators, each configured to generate a respective magnetic field (e.g. a changing magnetic field) through at least one of the plurality of electrochemical cells, wherein the plurality of magnetic flux generators and the plurality of electrochemical cells are arranged in an alternating manner.

Generally, the apparatus can be used to homogenise one or more regions within a plurality of electrochemical cells and enhance cell performance during cell formation (such as during FA&T) and/or during cell operation. Specifically, when the apparatus is used during cell formation, it may be used in the context of large-scale manufacturing facilities such as giga factories to form large qualities of electrochemical cells under magneto-electrochemistry conditions. When the apparatus is used during cell operation, it may be used to enhance the performance of large-scale stationary devices/systems such as stationary home energy storage.

Regardless of its application, different configurations of the apparatus 100 are possible. Examples of these are discussed with reference to FIGS. 1-17 below.

Figures 1A, 1B:
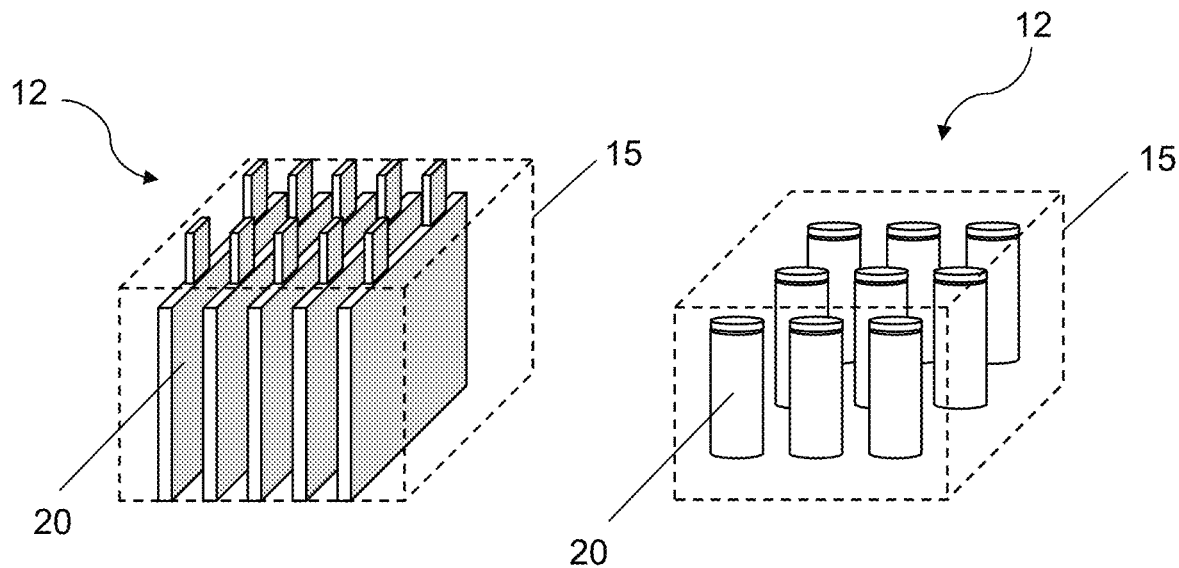
FIGS. 1A-1D each schematically shows a cell station comprising a plurality of electrochemical cells arranged respectively in a container or a tray.
Figures 1C, 1D:
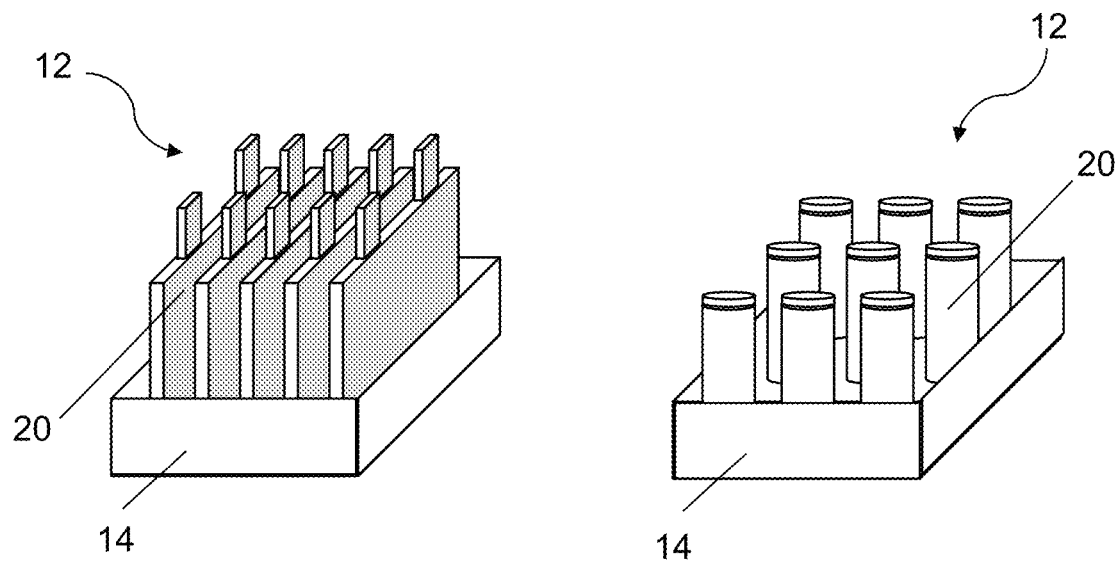

Firstly, the apparatus 100 may comprise one or more cell stations 12 each configured to contain a respective plurality of the electrochemical cells 20. Examples of such cell stations 12 are shown in FIGS. 1A-1D. Specifically, FIGS. 1A and 1B show a plurality of electrochemical cells 20 being contained within a cell container 15, while FIGS. 1C and 1D show a plurality of electrochemical cells being contained within a cell tray 14. For example, the/each cell tray/cell container may be formed of a magnetically susceptible material(s) for the purpose of guiding the field structure, e.g. to direct the magnetic fields towards preferred locations, e.g. localising and isolating the field to the/each cell tray/cell container to maximise control of the field structure and minimise stray magnetic field losses to the local environment.

Figure 2:
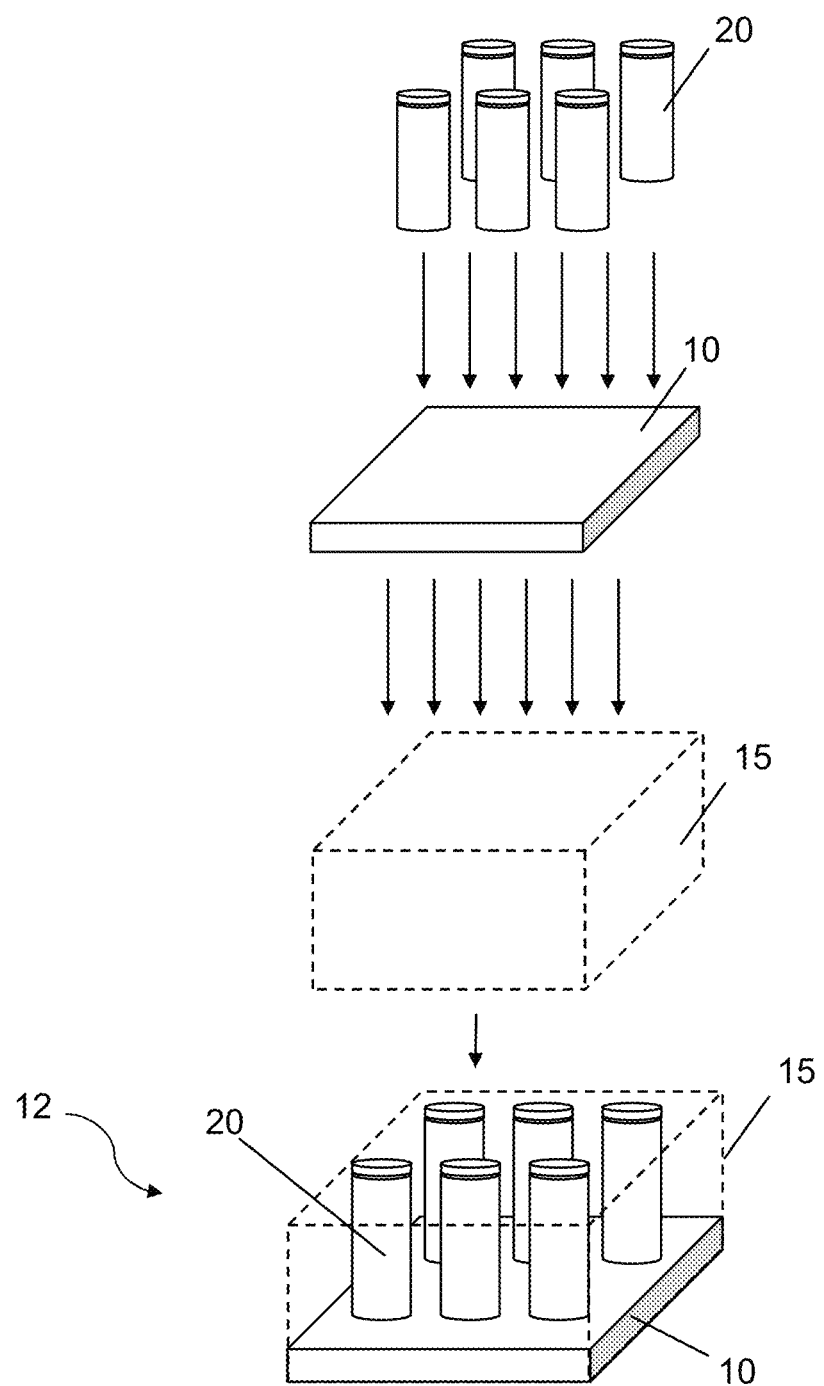
FIG. 2 shows a variant of a cell station comprising a plurality of electrochemical cells and a plurality of magnetic flux generators.

For example, the plurality of magnetic flux generators 10 of the apparatus 100 may be arranged inside the/each cell station 12 such that the/each cell station comprises at least one of the plurality of magnetic flux generators 10. Specifically, FIG. 2 shows a cell station 12 comprising a cell container 15 enclosing a single flat magnetic flux generator 10 which supports a plurality of cylindrical electrochemical cells 20 rested upright upon the magnetic flux generator.

Figure 3:
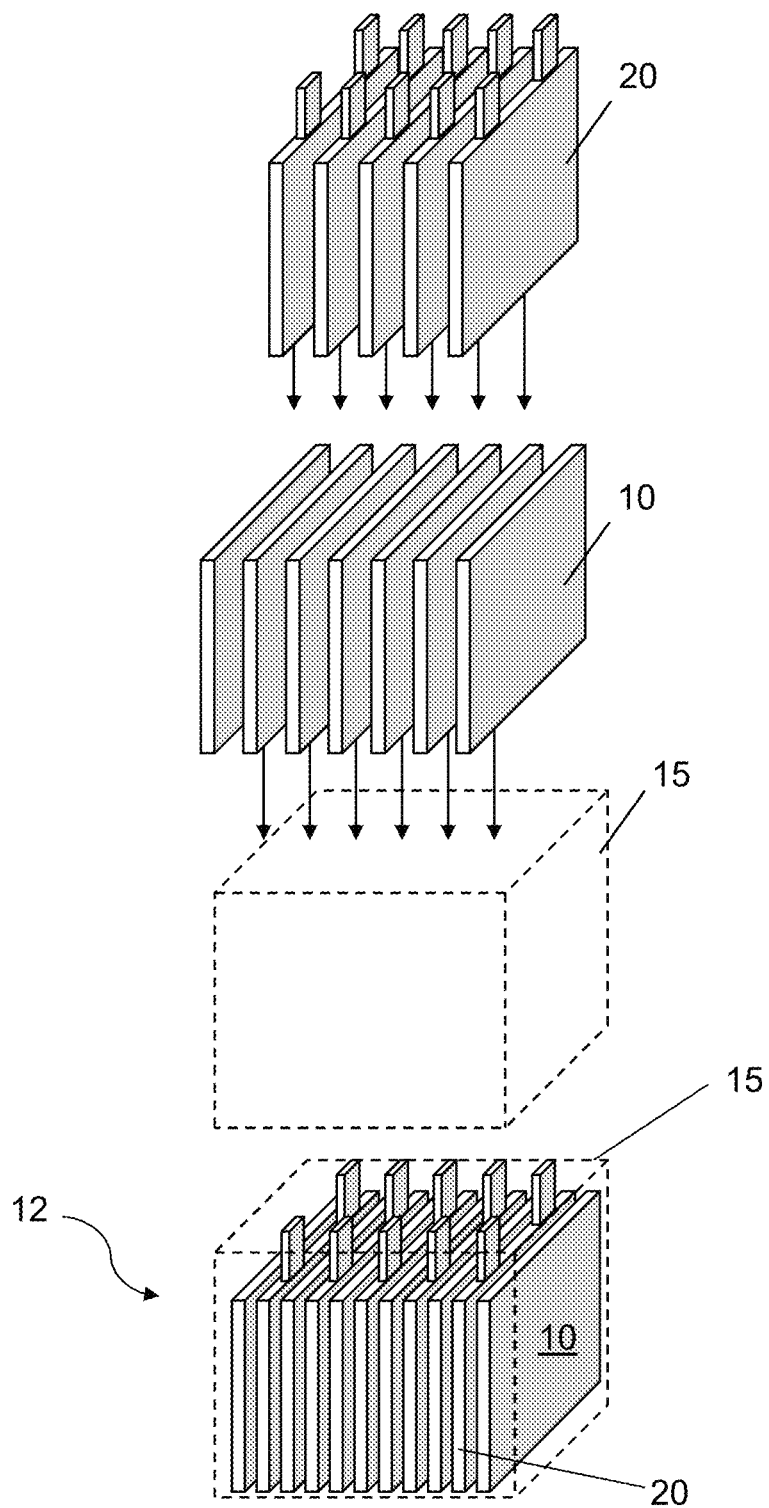
FIG. 3 shows a variant of a cell station comprising a plurality of electrochemical cells and a plurality of magnetic flux generators
Figure 4:
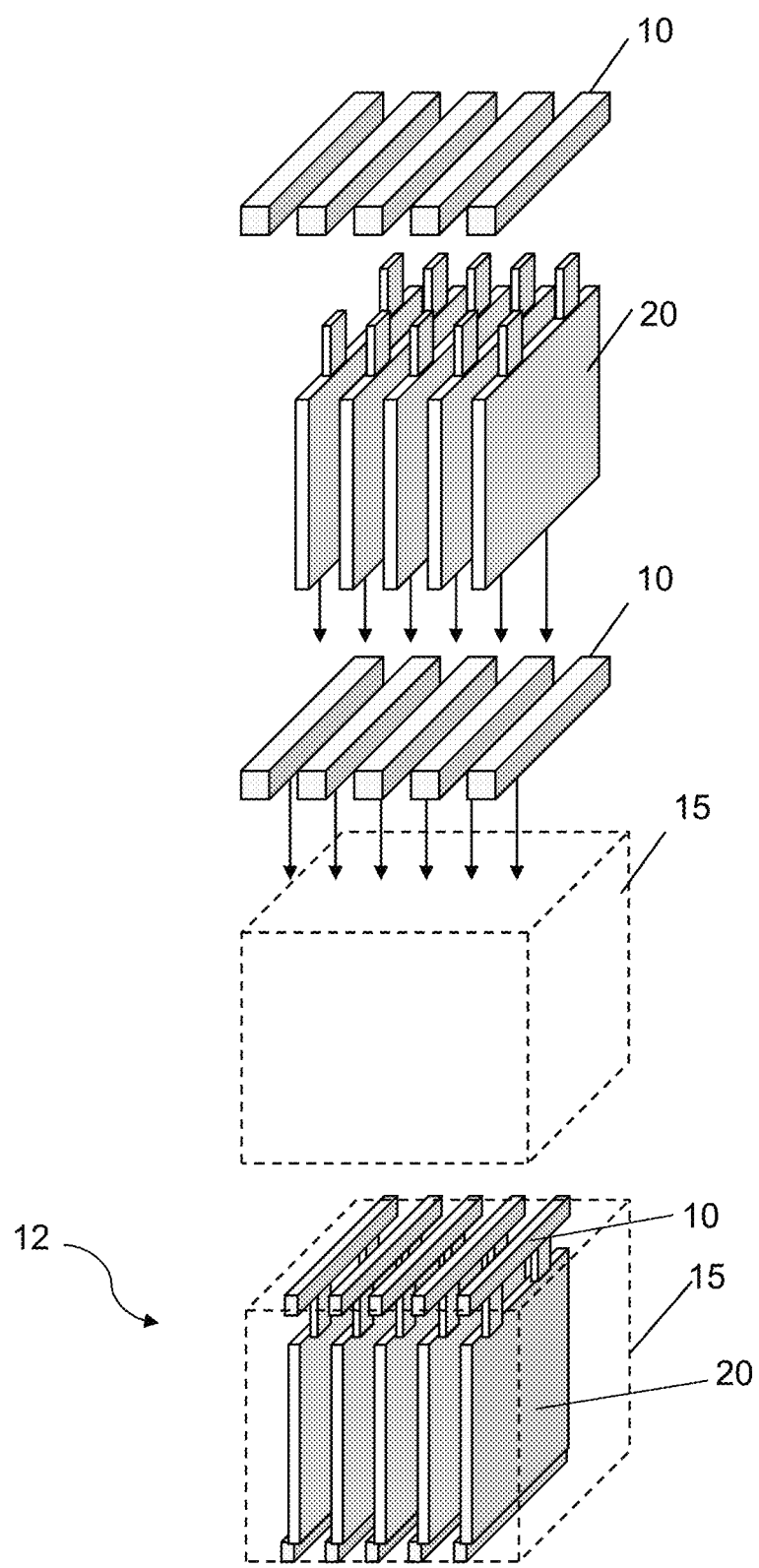
FIG. 4 shows a variant of a cell station comprising a plurality of electrochemical cells and a plurality of magnetic flux generators

In the examples of FIGS. 3-7 each cell station 12 comprises a respective cell container 15 enclosing at least as many magnetic flux generators 10 as electrochemical cells 20. In some of these arrangements, each cell 20 is sandwiched between a respective pair of magnetic flux generators 10. For example, in FIG. 3, the electrochemical cells 20 are pouch cells arranged inside the cell container 15 in an alternating manner with a plurality of flat (planar) magnetic flux generators 10. In the variant of FIG. 4, the magnetic flux generators 10 are elongated slabs extending along respective top and bottom edges of each pouch cell 20. The top edge of a pouch cell is the edge comprising its tabs, and the bottom edge is opposite the top edge. Each pouch cell 20 is sandwiched by a respective pair of magnetic flux generators located respectively at its top and bottom edges. Modifications to this configuration are possible. For example, the elongated magnetic flux generators 10 may extend substantially perpendicularly or at an acute/obtuse angle to the top/bottom edges of the pouch cells.

Figure 5:
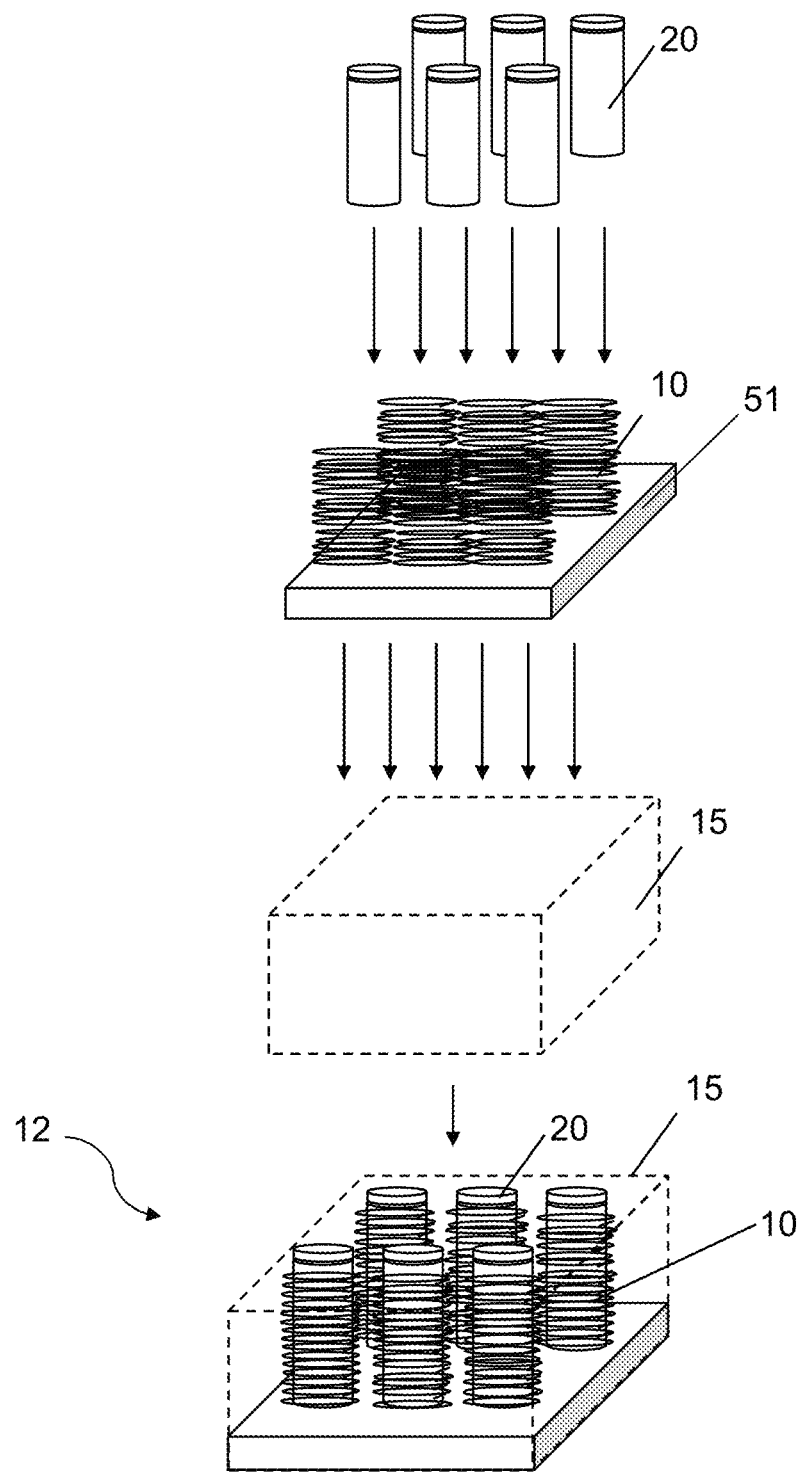
FIG. 5 shows a variant of a cell station comprising a plurality of electrochemical cells and a plurality of magnetic flux generators

Further example arrangements of cylindrical electrochemical cells 20 are discussed with reference to FIGS. 5-7. In the example of FIG. 5, each cell station 12 comprises a mechanical support 51 supporting upright a plurality of magnetic flux generators 10 each of which is an air-core electromagnet longitudinally (i.e. axially) and radially extending to define a space for accommodation of a respective one of the cylindrical electrochemical cells 20. By air-core electromagnet, here it is a meant a coil of wire (i.e. solenoid) which comprises a central air-filled space defined by the coil and does not comprise a solid core, such as a ferromagnetic core. In this arrangement, the air-core electromagnets are supported upright on a floor of the cell container 15 and each surrounds a respective cylindrical cell 20.

Figure 6:
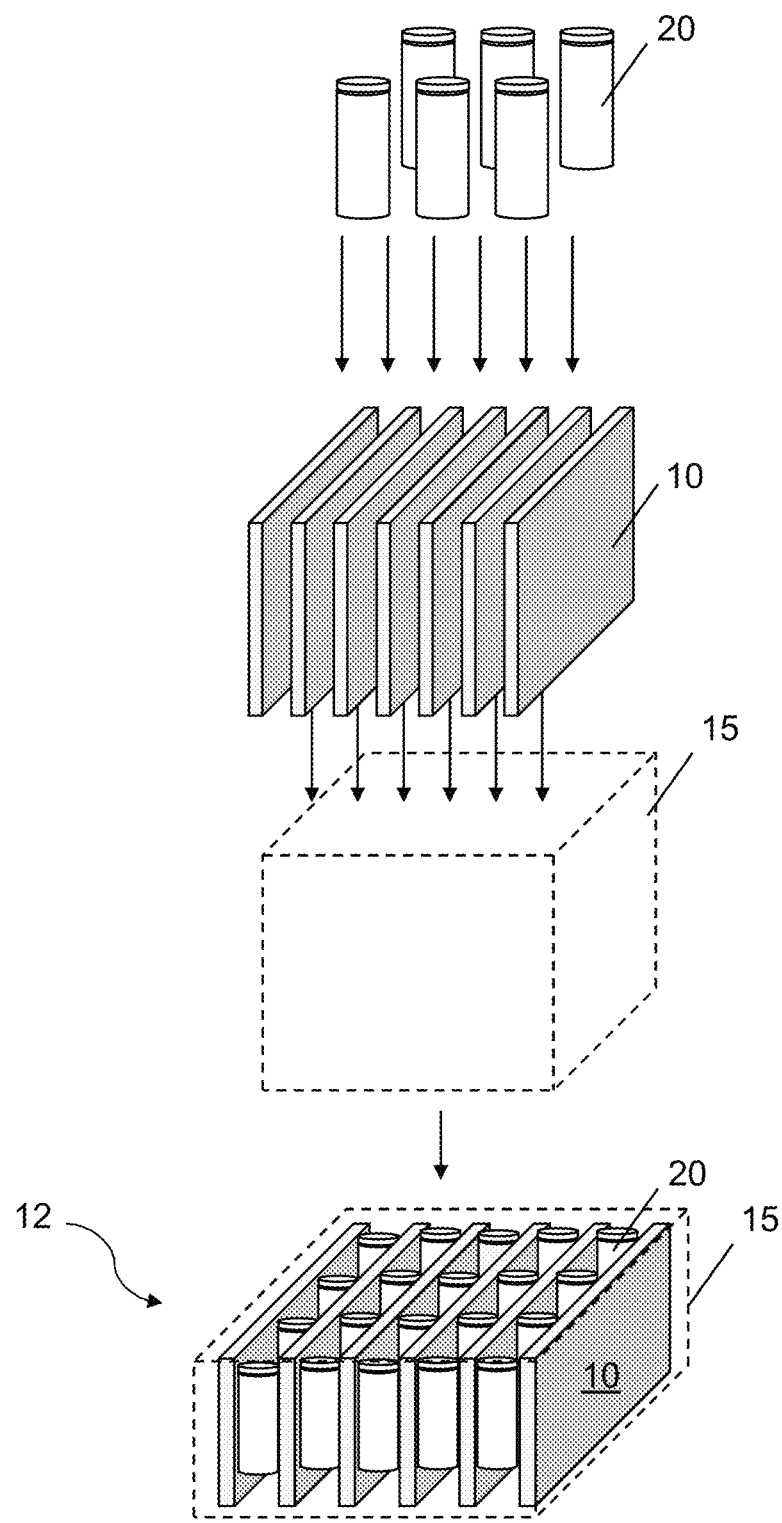
FIG. 6 shows a variant of a cell station comprising a plurality of electrochemical cells and a plurality of magnetic flux generators

In the alternative arrangement of FIG. 6, the cylindrical cells 20 are similarly arranged in a grid but each magnetic flux generator 10 is a flat magnetic flux generator. The magnetic flux generators 10 are arranged such that each row of electrochemical cells 20 is laterally sandwiched between a respective pair of magnetic flux generators 10 extending upright and parallel to respective sidewalls of the cell container 15.

Figure 7:
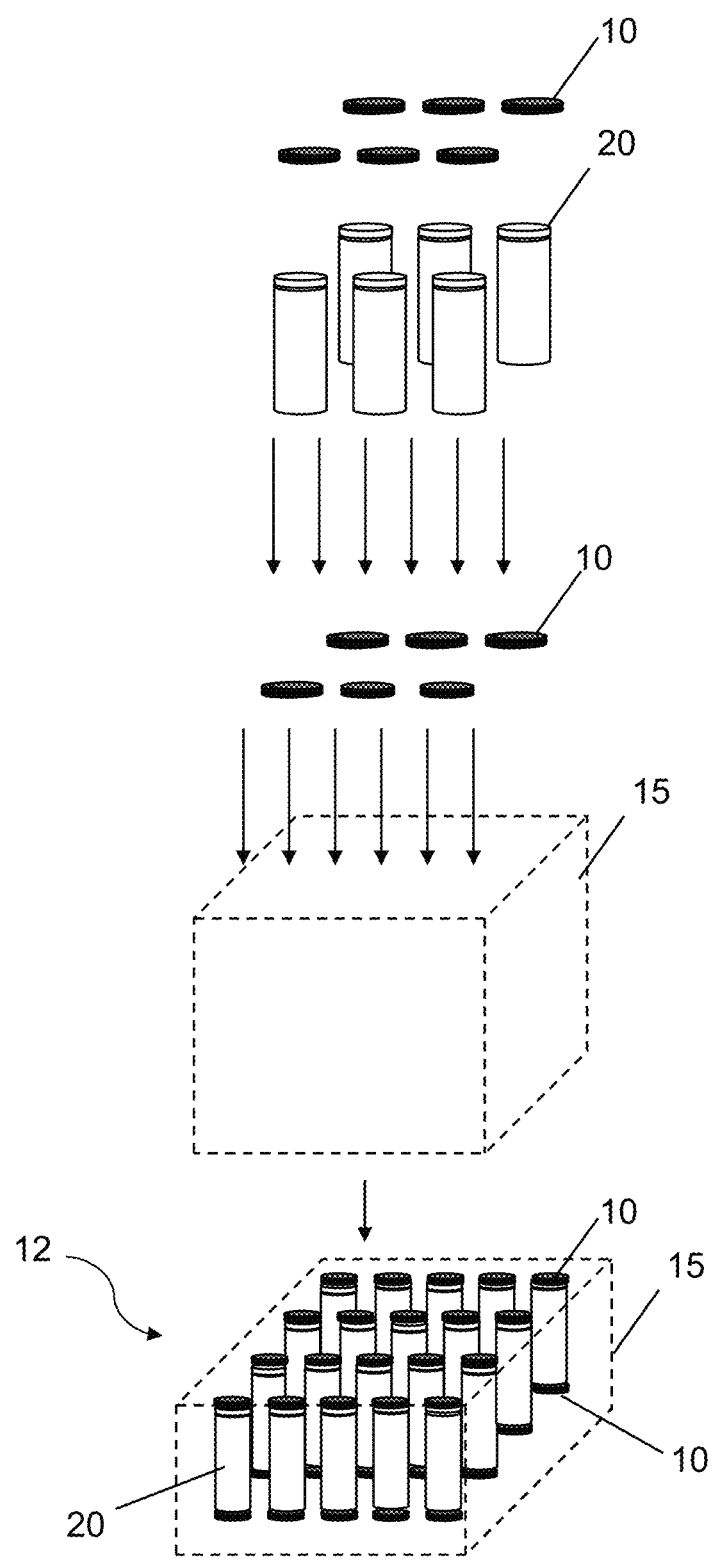
FIG. 7 shows a variant of a cell station comprising a plurality of electrochemical cells and a plurality of magnetic flux generators

Finally, in the arrangement of FIG. 7, each magnetic flux generator 10 is a disc-shaped magnetic flux generator. The cylindrical cells 20 are arranged upright inside the cell container 15, in a grid. Each cylindrical cell has a bottom wall, a top wall, and a sidewall extending therebetween. A respective magnetic flux generator 10 is provided on or in close proximity to the bottom wall and the top wall of each cylindrical cell, such that each cell is longitudinally (vertically) sandwiched between a respective pair of disc-shaped magnetic flux generators 10. Each magnetic flux generator 10 may have an area equal to or substantially equal to the area of the wall (i.e. top or bottom wall) it is provided on or in close proximity to.

Cell stations 12 of the type discussed with reference to FIGS. 2-7 may be arranged in a grid/array and/or stacked such that they are vertically aligned. Conveniently, this can allow the cell stations 12 to be shelved into towers 17 as shown in FIGS. 8A-10B, e.g. for use in large-scale cell manufacturing facilities or in stationary home energy storage.

Figure 8A:
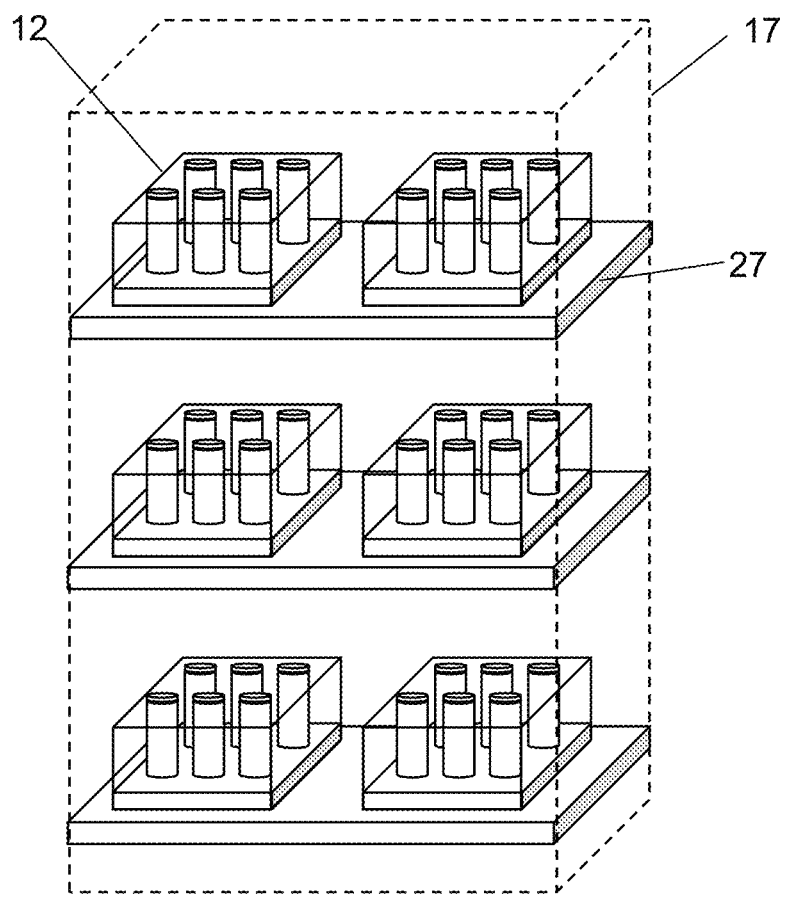
FIG. 8A shows a plurality of the cell stations of FIG. 2 arranged in a tower.
Figure 8B:
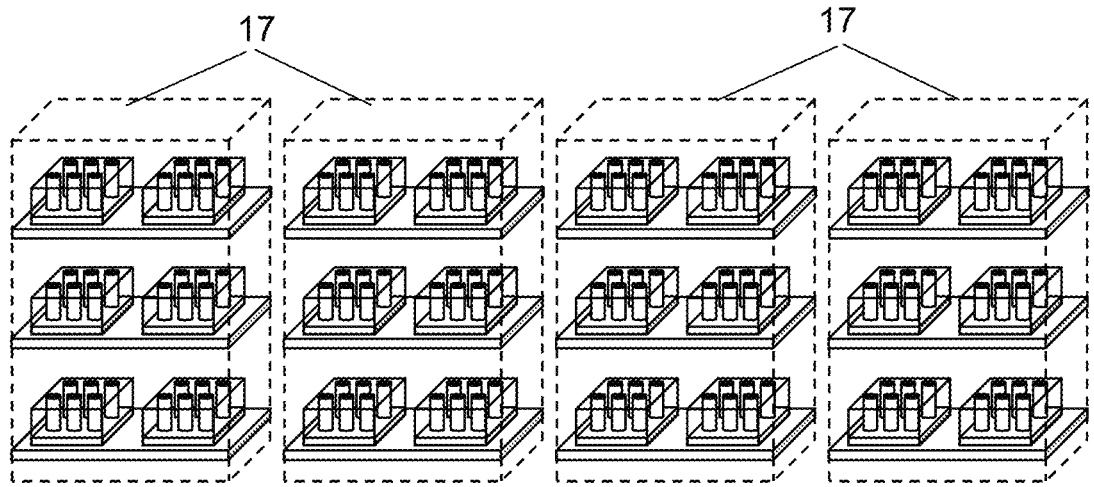
FIG. 8B shows a plurality of the towers of the type shown in FIG. 8A.
Figure 9A:
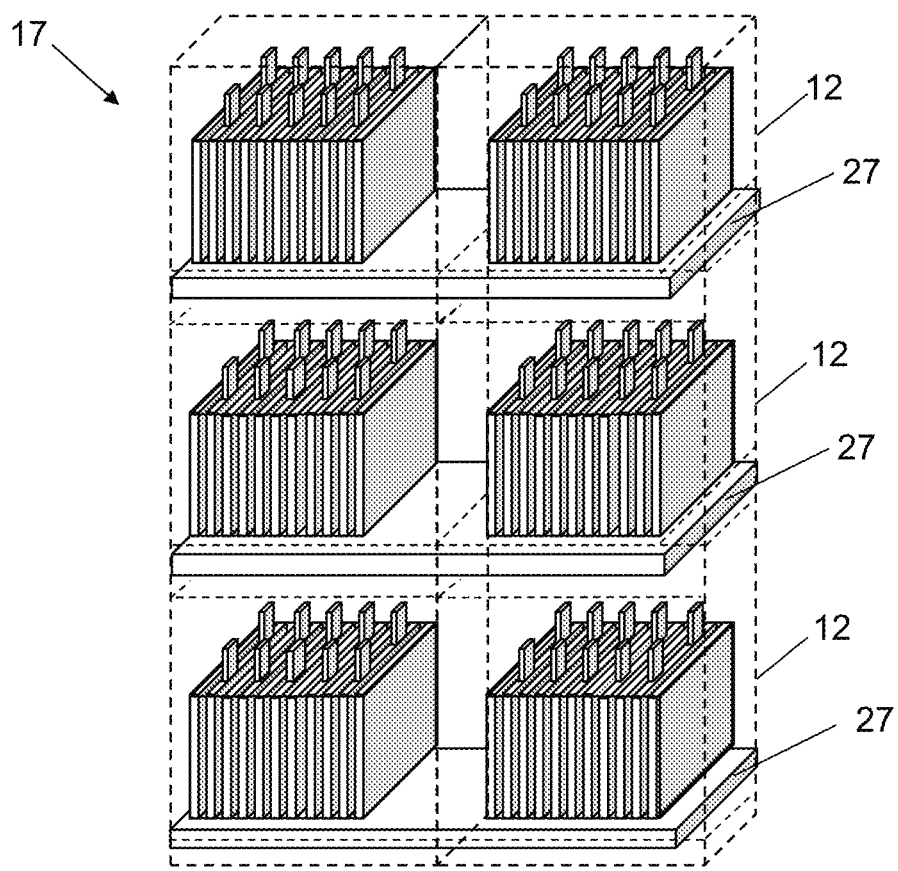
FIG. 9A shows a plurality of the cell stations of FIG. 3 arranged in a tower.
Figure 9B:
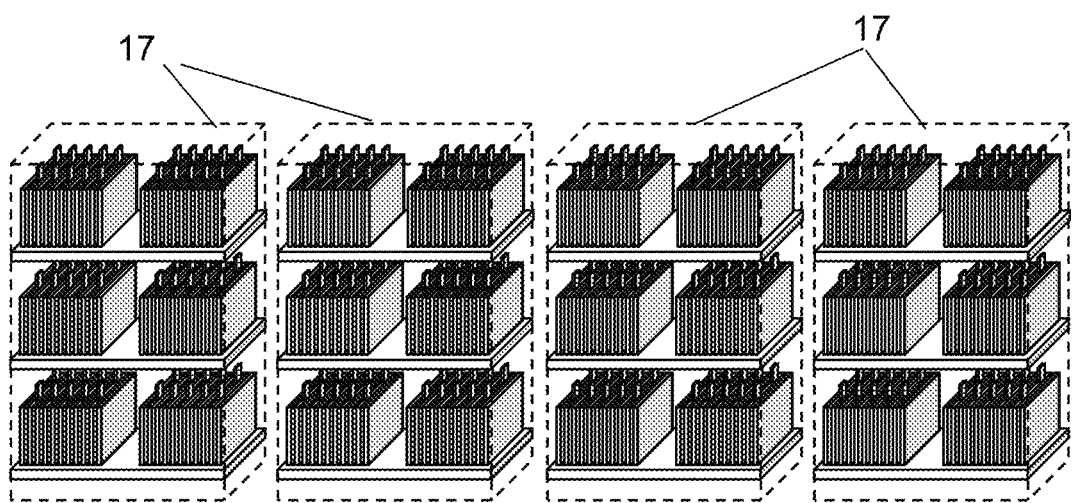
FIG. 9B shows a plurality of the towers of the type shown in FIG. 9A.
Figure 10A:
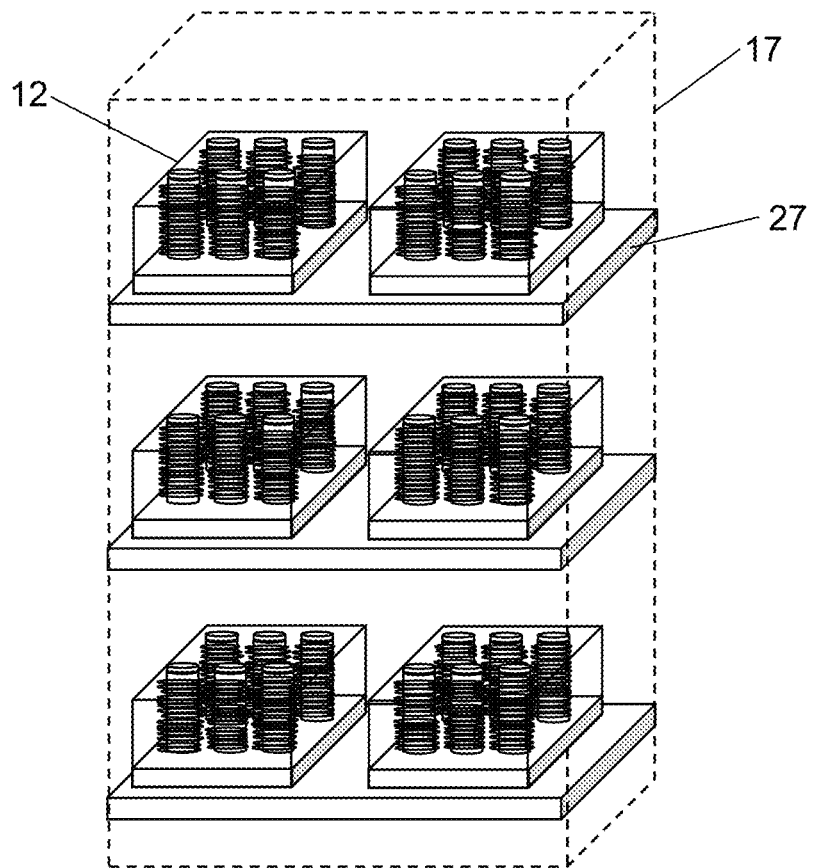
FIG. 10A shows a plurality of the cell stations of FIG. 5 arranged in a tower.
Figure 10B:
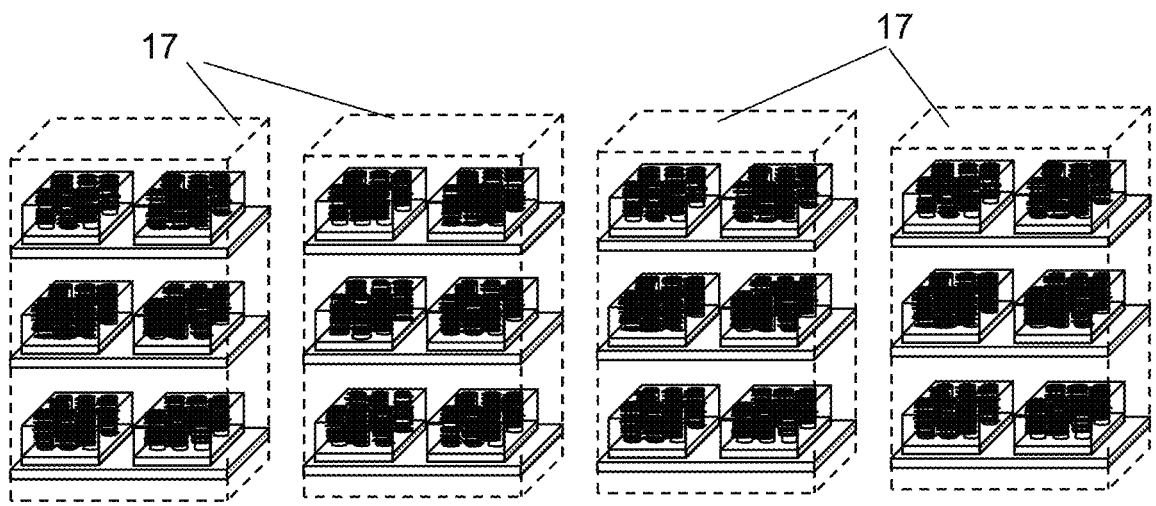
FIG. 10B shows a plurality of the towers of the type shown in FIG. 10A.

Specifically, FIGS. 8A, 9A, and 10A show the cell stations respectively of FIGS. 2, 3, and 5 arranged on shelves 27 and vertically stacked in a tower 17. In large-scale cell manufacturing facilities or stationary home energy storage, multiple towers 17 may be arranged next to each other (as shown in FIGS. 8B, 9B, and 10B) and/or vertically.

Figure 11:
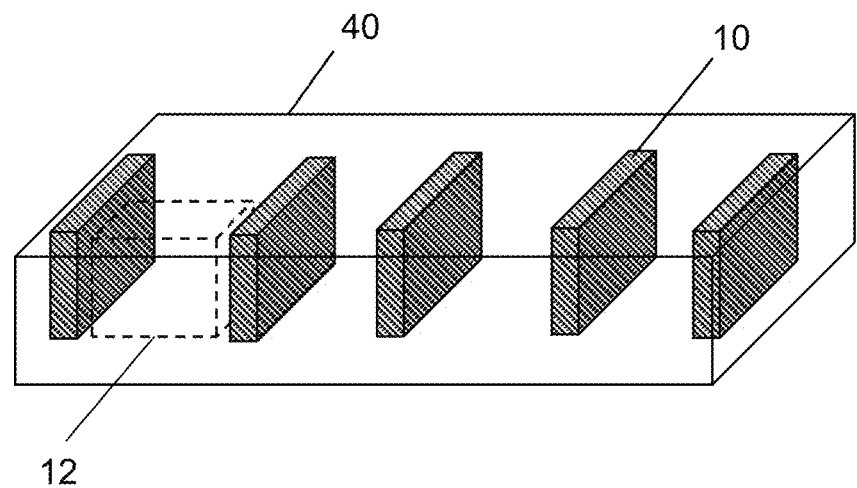
FIG. 11 shows a container comprising a plurality of cell stations interspersed among a plurality of magnetic flux generators.
Figure 12:
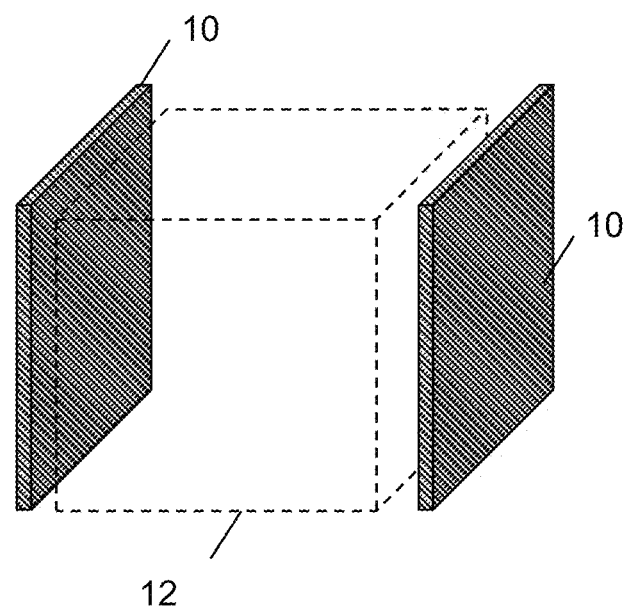
FIG. 12 shows a partial view of the container of FIG. 11.
Figure 13:
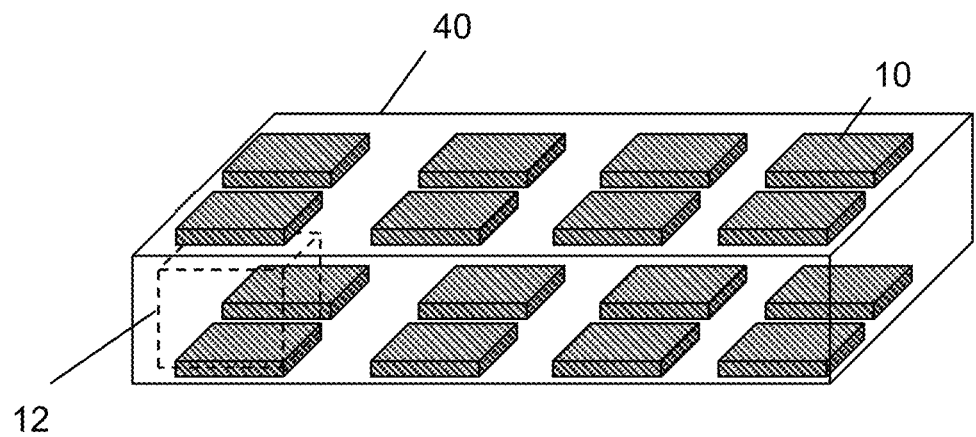
FIG. 13 shows a container comprising a plurality of cell stations interspersed among a plurality of magnetic flux generators.
Figure 14:
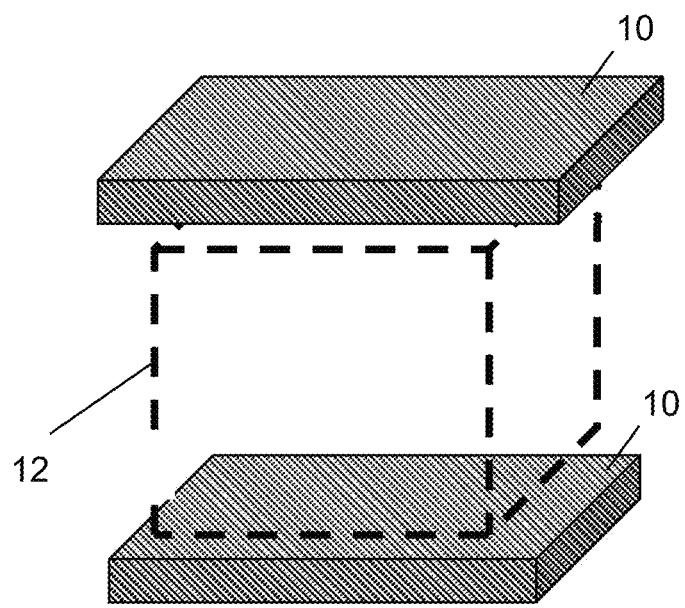
FIG. 14 shows a partial view of the container of FIG. 13.

Next, when the apparatus 100 comprises a plurality of cell stations 12, these may be contained (enclosed) within a container 40. This is discussed with reference to FIGS. 11, 13, 15A, and 15B. In the examples of FIGS. 11 and 12, the container 40 comprises a plurality of cell stations 12 (only one of which is shown) and a plurality of flat magnetic flux generators 10. The cells stations 12 and the magnetic flux generators 10 within the container are arranged in an alternating manner. In the example of FIG. 11, the magnetic flux generators 10 extend vertically (i.e. parallel to sidewalls of the container) such that each cell station 12 is laterally sandwiched between a respective pair of magnetic flux generators 10. This is also shown in FIG. 12 which is a partial view of the container 40 of FIG. 11. In the example of FIG. 13, the magnetic flux generators 10 extend parallel to top and bottom walls of the container such that each cell station 12 is vertically sandwiched between a respective pair of magnetic flux generators 10. This is also shown in FIG. 14 which is a partial view of the container 40 of FIG. 13.

Figure 15A:
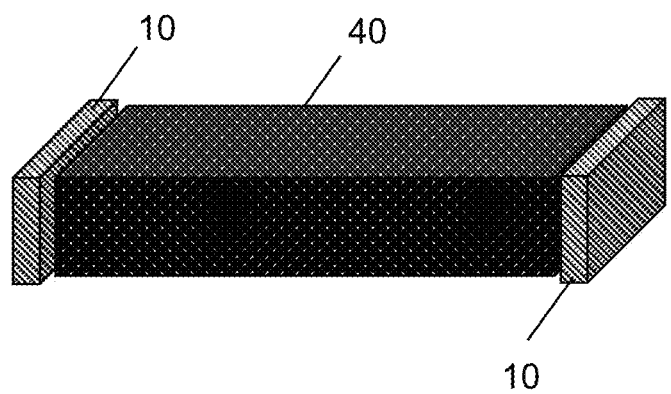
FIGS. 15A-15B show respective variants of a container comprising a plurality of cell stations being sandwiched by a pair of magnetic flux generators.
Figure 15B:
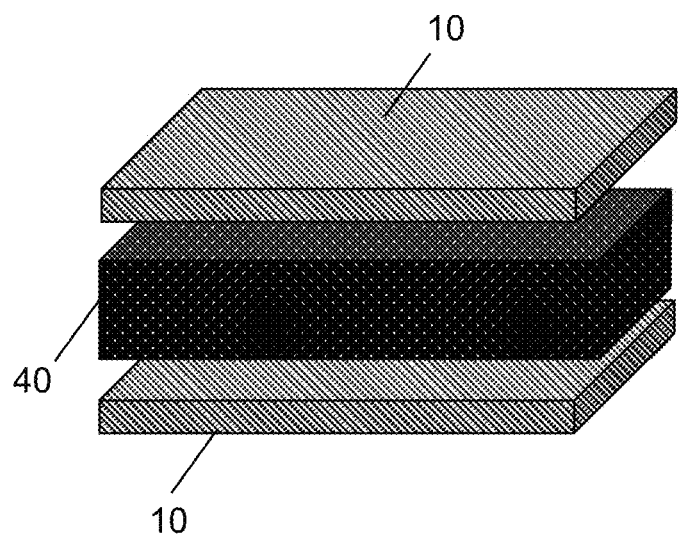

It is also possible to arrange at least one of the plurality of magnetic flux generators 10 externally to the container 40 and adjacent to walls thereof. Two such example configurations are discussed with reference to FIGS. 15A and 15B. In FIG. 15A, the container 40 is laterally sandwiched by a pair of magnetic flux generators 10 extending vertically and parallel to respective sidewalls of the container. In the example of FIG. 15B, the container 40 is vertically sandwiched by a pair of magnetic flux generators 10 parallel to respective top and bottom walls of the container.

The apparatus 100 may comprise at least one electrical power source 1 configured to supply electrical power to the plurality of electrochemical cells 20. For example, the electrical power source 1 may be electrically connected to each electrochemical cell 20 via electrical circuit 24 to supply electrical power thereto as shown in the schematic views of FIGS. 16A and 16B. The schematic, simplified electrochemical cell 20 shown in FIGS. 16A, 16B comprises a pair of current collectors 22 each having an inner side coated with an active material coating to thereby provide a respective electrode 21, electrolyte (not shown) provided between the electrodes, and a separator 25 provided within the electrolyte and interposed between the electrodes. The application of active material coatings to the respective inner sides of both current collectors may be preferred. Generally, the active material coating may be either single (e.g. coating only the inner side of the respective current collector) or double-sided (i.e. coating both the inner and outer sides of the respective current collector). However, in the interest of visual simplicity, single-sided active material coatings have been shown in FIGS. 16A, 16B, 19, 22, 26, and 29. Each magnetic flux generator 10 may be connected to a shared or respective power supply 2 via an electrical circuit 24' to receive electrical power therefrom. The power supply 2 is distinct from the electrical power source 1.

In the example of FIG. 15A, the magnetic flux generator 10 comprises a permanent magnet 10' and a mechanism 26 for moving the permanent magnet so as to generate a changing magnetic field. The mechanism 26 may be for example an electrical motor connected to the power supply 2 via the electrical circuit 24'. In the example of FIG. 15B, the magnetic flux generator 10 comprises an electromagnet which is itself connected to the power supply 2 via the electrical circuit 24' to generate its respective (e.g. changing) magnetic field. The electromagnet may be any type of electromagnet. The electromagnet generally comprises a coil of wire wound around a core. For example, the core may be a metal core (e.g. a ferromagnetic core), or it may be an air-filled space at the centre of the electromagnet, i.e. an air core. The magnetic field produced by the electromagnet may be varied/controlled by varying the amount of electrical power and/or the direction of the electrical current supplied thereto by the power supply.

Figure 17B:
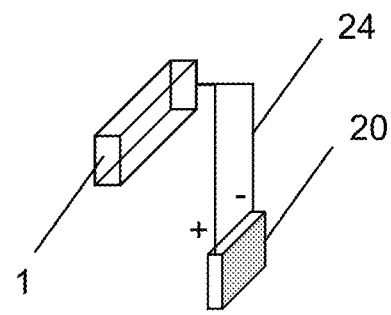
FIG. 17B shows an exploded partial view of the apparatus of FIG. 17A.
Figure 17A:
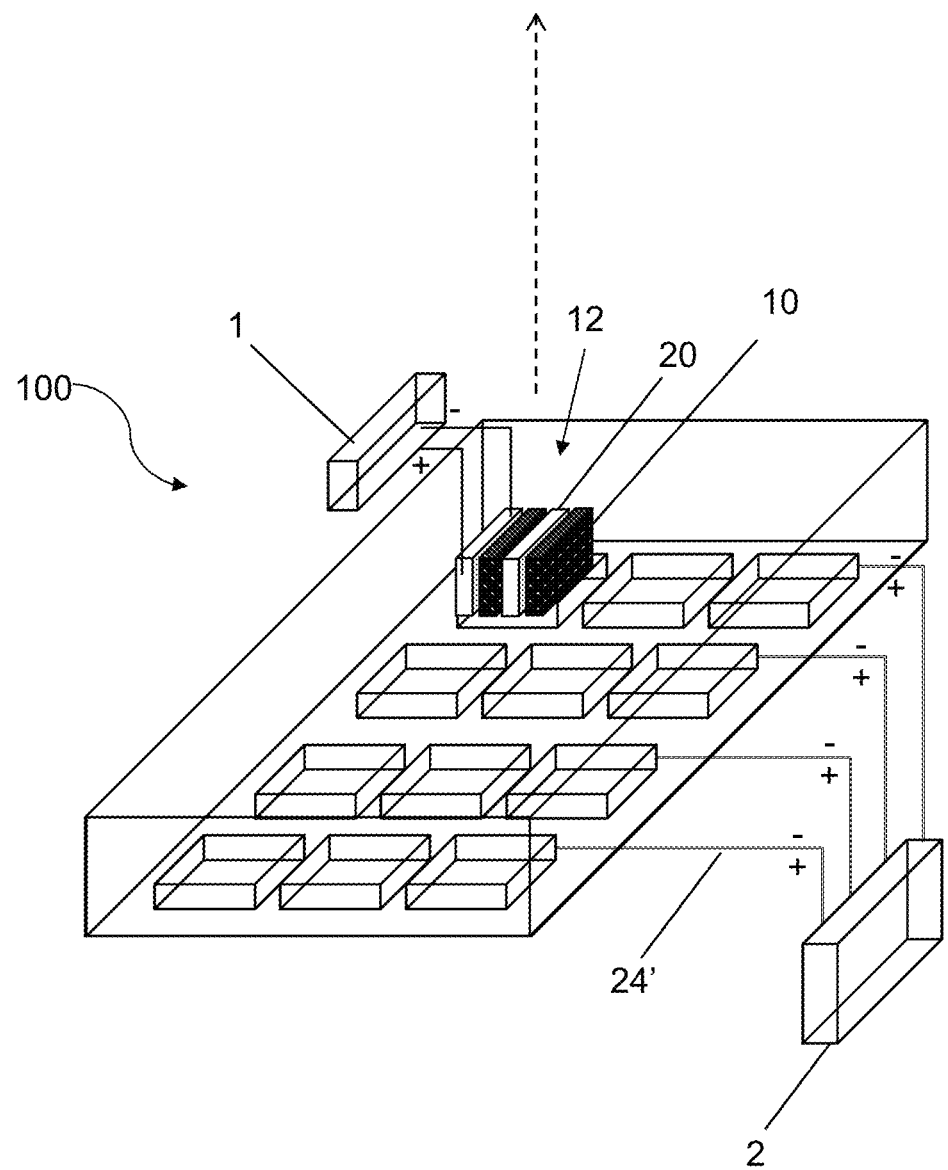
FIG. 17A schematically shows an apparatus for homogenising one or more regions within a plurality of electrochemical cells.
Figure 18B:
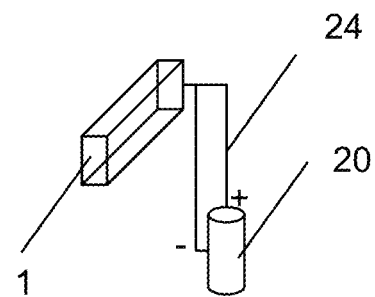
FIG. 18B shows an exploded partial view of the apparatus of FIG. 18A.
Figure 18A:
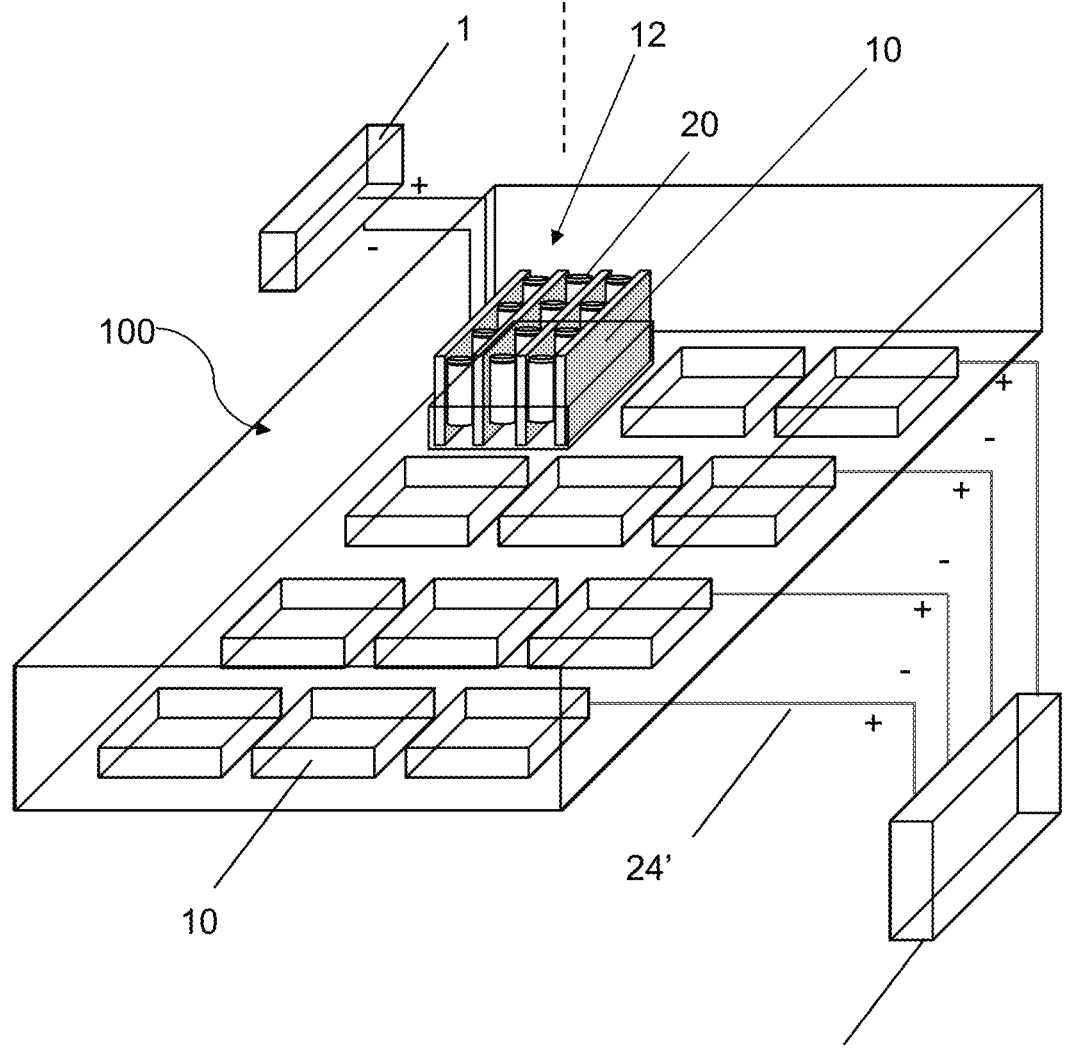
FIG. 18A schematically shows an apparatus for homogenising one or more regions within a plurality of electrochemical cells.

Example configurations of an apparatus 100 comprising a plurality of cell stations 12 and plurality of magnetic flux generators 10 where the electrochemical cells are electrically connected to an electrical power source 1 and the magnetic flux generators are electrically connected to a shared power supply 2 are discussed with reference to FIGS. 17A and 18A. In both figures, one of the cell stations 12 is shown to contain a plurality of electrochemical cells 20 and a plurality of magnetic flux generators 10 and the plurality of cell stations 12 are arranged in a grid. The magnetic flux generators 10 of all cell stations 12 are electrically connected to the shared power supply 2, distinct from the electrical power source 1. In the examples of FIGS. 17A and 18A, the magnetic flux generators 10 of each row of cell stations 12 are connected to the shared power supply 2 via a respective shared electrical connection which is part of an electrical circuit 24'. The electrochemical cells 20 shown in FIGS. 17A and 18A are each connected to the electrical power source 1 as shown in more detail respectively in the exploded views of FIGS. 17B and 18B. The cells 20 and magnetic flux generators 10 within each cell station 12 in FIG. 17A are arranged in the manner shown in FIG. 3 while those shown in FIG. 18A are arranged in the manner shown in FIG. 6. However, it is also possible to configure the apparatus 100 of FIGS. 17A and 18A such that the electrochemical cells 20 and magnetic flux generators 10 are arranged in cell stations according to the cell station arrangements of any one of FIGS. 2, 4, 5, 7.

Next, the advantageous effects of the present invention are discussed with reference to FIGS. 18-32B. Specifically, example configurations of an electrochemical cell 20 connected to an electrical power source 1 via an electrical circuit 24 for example during cell formation (e.g. during the FA&T stage), or during cell operation are shown in FIGS. 19, 22, and 24. Thus, in these configurations, layers (e.g. interfacial layers) are formed under electrochemistry conditions.

Figure 16A:
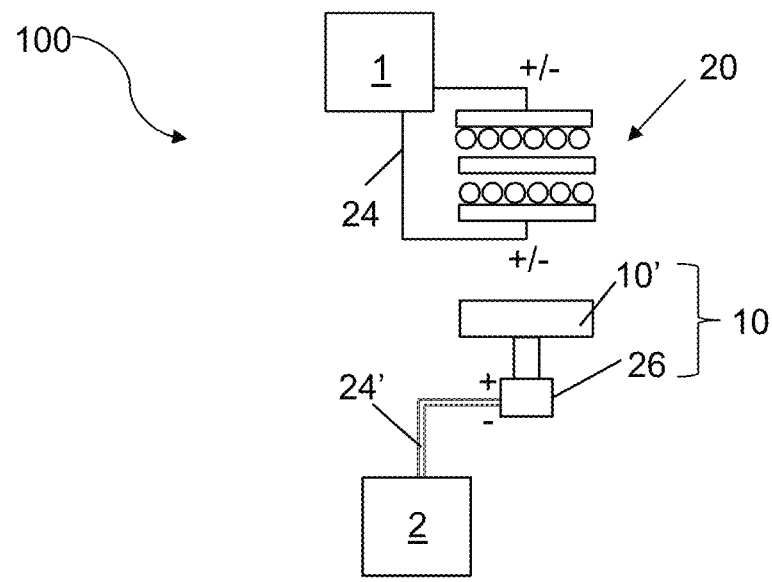
FIGS. 16A-16B schematically show respective variant configurations of an electrochemical cell connected to an electrical power source and a magnetic flux generator connected to a power supply.
Figure 16B:
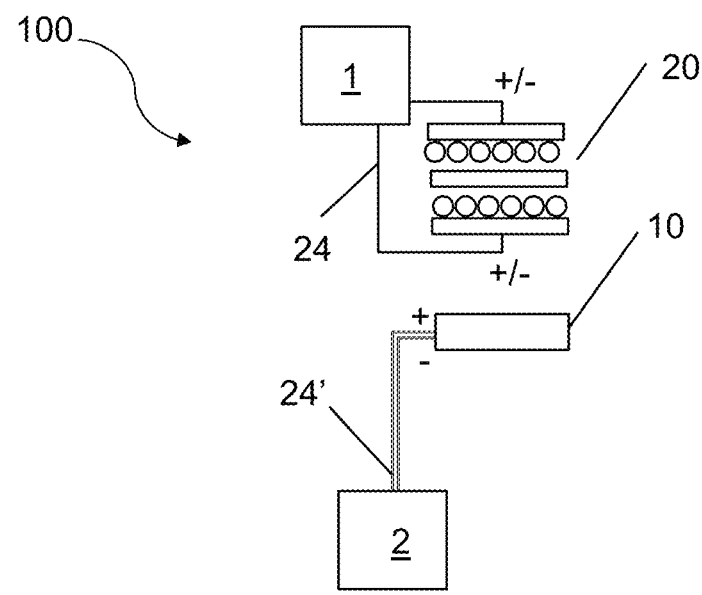

FIG. 19 shows an electrochemical cell 20 identical to that shown in FIGS. 16A, 16B. FIGS. 22 and 24 show respective variants of the electrochemical cell 20 of FIG. 1. The electrochemical cell of FIG. 22 comprises a pair of current collectors 22, 22' only one of which 22' comprises an active material coating providing the electrode 21. The active material coating providing the electrodes 22 of FIG. 19 and the respective electrode 22' of FIG. 22 each have a textured surface. The textured surface of the active coating is provided by a plurality of spaced electrode particles. The electrode particles in the example of FIG. 19 are substantially spherical, while in the example of FIG. 22, the electrode particles are substantially rectangular, extending away from the current collector so as to form pillar-like electrode structures. The electrochemical cell 20 of FIG. 24 only comprises a pair of flat (planar) current collectors 22 acting as electrodes but not comprising any active material coating. Generally, electrodes can be provided by plain current collectors (i.e. not comprising any active material coating), by a single layer of or a multi-layer stack of active material coating, or by packing active (electrode) material.

During cell formation and/or operation under electrochemistry conditions, respective layers (such as interfacial layers) 23 are formed on the electrodes 21. For example, interfacial layers 23 may be part of the solid-electrolyte interface (SEI). The formation of interfacial layers 23 in the cells 20 of the examples of FIGS. 19, 22, and 24 are shown respectively in FIGS. 20A and 20B, 23A and 23B, 25A and 25B. Specifically, FIGS. 20A, 23A, and 25A each show a respective exploded partial view of the cell 20 of respectively FIGS. 19, 22, and 24, including one of its electrodes 21 before the formation of an interfacial layer. As already discussed, it can be challenging to reliably control the formation of layers under electrochemistry conditions. Thus, the interfacial layers 23 formed under these conditions usually have a heterogenous structure, which can negatively impact the performance of the electrochemical cell 20.

The interfacial layers 23 formed are shown respectively in FIGS. 20B, 23B and 25B. As can be seen from these figures, the respective interfacial layers 23 lack homogeneity and are not uniformly distributed on the electrode 21. Indeed, this is also illustrated by FIGS. 21A and 21B, with FIG. 21A showing an exploded partial view of the electrode of FIG. 20A (i.e. a single electrode particle) before the interfacial layer 23 is formed, while FIG. 21B shows the electrode particle of FIG. 21A coated by a portion of the heterogeneous interfacial layer 23.

The lack of homogeneity in interfacial layers 23 is an example of a technical challenge addressed by the present invention.

The present invention is based on the observation that providing a magnetic field through an electrochemical cell while the cell is under electrochemistry conditions (during cell formation and/or cell operation) significantly improves the homogeneity of the formed layers and thus of one or more regions within the cell, thereby improving the cell's performance and/or longevity.

Figure 29:
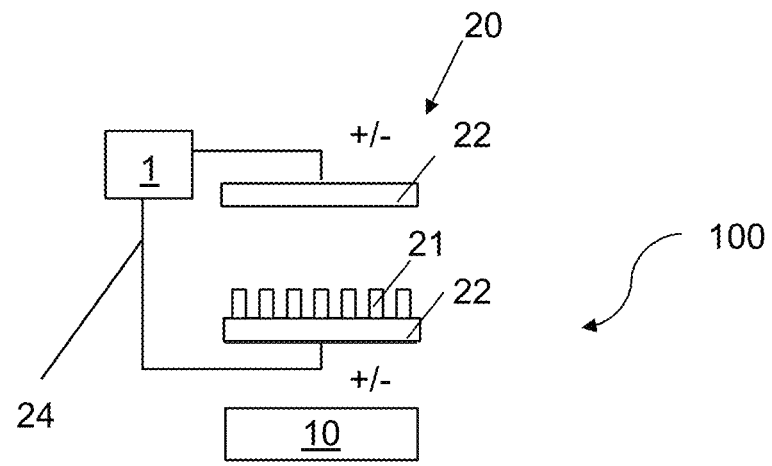
FIG. 29 schematically shows a configuration comprising an electrochemical cell and a magnetic flux generator.
Figure 30A:
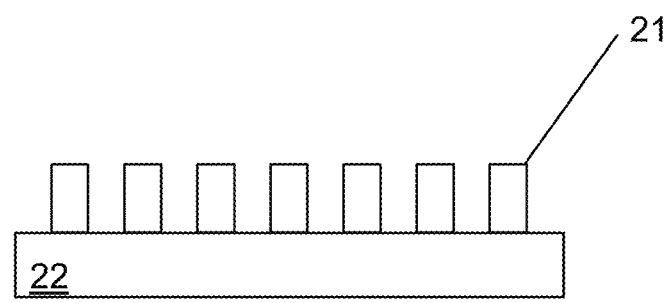
FIGS. 30A-30B schematically show a current collector and an electrode of the electrochemical cell of FIG. 29 respectively before and after the deposition of an interfacial layer.
Figure 30B:
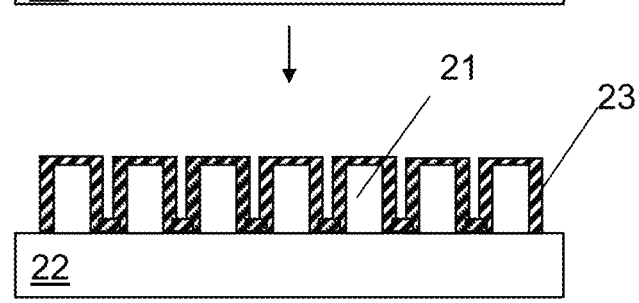

This concept is illustrated in FIGS. 26 to 32B. Specifically, FIGS. 26, 29, 31 show the electrochemical cell 20 respectively of FIGS. 19, 22, and 24 connected to the electrical power source 1 via the electrical circuit 24 and additionally, a magnetic flux generator 10 configured to generate a magnetic field (e.g. a changing magnetic field) through the electrochemical cell 20. Thus, the cells of FIGS. 26, 29, 31 are subjected to magneto-electrochemistry conditions by virtue of providing the magnetic field therethrough. This improves the homogeneity of the deposited interfacial layer 23 as shown in FIGS. 27A, 27B, 28A, 28B, 30A, 30B, 32A, and 32B as contrasted respectively with FIGS. 20A, 20B, 21A, 21B, 23A, 23B, 25A, 25B.

Modifications of the apparatus 100 are possible. Each magnetic field generated by each magnetic flux generator 10 may be a static magnetic field or a changing magnetic field. Each changing magnetic field may be one of or any combination of: rotating, pulsed, and/or oscillating. Rotation of each changing magnetic field may be around an axis having a component perpendicular to a direction of the respective changing magnetic field. The rotation of each changing magnetic field may be around an axis having a component parallel to a direction of the respective changing magnetic field. Rotation of each changing magnetic field may be around an axis having a component perpendicular to a direction of current flow within the/each electrochemical cell. The rotation of each changing magnetic field may be around an axis having a component parallel to a direction of current flow of the/each electrochemical cell. Each rotating magnetic field may be provided by rotating one or more of the electrochemical cells, by a rotating permanent magnet, or a temporary magnet, or an electromagnet or may be provided by an array of electromagnets which are sequentially activated to effectively rotate the respective magnetic field.

Each changing magnetic field may be controllably variable in one, two, and/or three spatial dimensions. Additionally, or alternatively, the polarity and/or magnitude of each magnetic field may be controllably variable.

Each magnetic flux generator may comprise one or more magnetic field sources. The one or more magnetic field sources may be a plurality of magnetic field sources. The plurality of magnetic field sources may be arranged in a common plane. At least one of the one or more magnetic field sources may comprise a permanent magnet and a respective mechanism (e.g. electric motor) for moving the permanent magnet and/or one or more of the electrochemical cells. At least one of the one or more magnetic field sources may be an electromagnet.

The apparatus 100 as for example shown in FIGS. 17A and 18A may be adapted to further comprise a controller (not shown) configured to: monitor electrochemical overpotential of each of the one or more electrochemical cells 20 as each of the one or more changing magnetic fields is varied; and select an optimal value for each changing magnetic field to minimize each electrochemical overpotential. The monitoring may be discrete or continuous. Additionally, the controller may select an optimal value for any one or any combination of the polarity, magnitude, phase, amplitude, and/or frequency of each changing magnetic field to minimize the electrochemical overpotential. The controller may repeat the monitoring of each electrochemical overpotential and the selection of optimal values as many times as required to minimize each electrochemical overpotential.

The controller may be configured to monitor each electrochemical overpotential via direct overpotential measurements. The direct overpotential measurements may be performed for example using electrochemical impedance spectroscopy (with electrical impedance measurements at multiple frequencies or fixed-frequency impedance). Alternatively, any one or any combination of the amplitude, phase shift, and frequency of the/each cell's electrochemical potential or electrical current may be measured to monitor the electrochemical overpotential.

The controller may be configured to monitor each electrochemical overpotential using any one of or any combination of electric, magnetic, optical, acoustic measurements performed on the one or more electrochemical cells. For example, such measurements may be used as a proxy for determining the electrochemical overpotential of each electrochemical cell. The controller may be electrically connected to each of the one or more magnetic flux generators and to each of the one or more electrochemical cells.

When the controller is configured to monitor each electrochemical overpotential using any one of or any combination of electric, magnetic, optical, acoustic measurements performed on the one or more electrochemical cells, the controller may be electrically connected to each magnetic flux generator and to each electrochemical cell, and additionally communicatively connected to a sensor unit (not shown) configured to perform the electric, magnetic, optical, and/or acoustic measurements. For example, the sensor unit may comprise any one or any combination of Hall, Gauss, optical, and/or acoustic sensors. This is because electric, magnetic, optical, acoustic measurements can be indicative of the state of charge/health of an electrochemical cell. For example, the optical sensors may be configured to measure deformation and/or build-up/loss of material at selected locations on the one or more electrochemical cells. The acoustic sensors may be configured to measure decibel response to acoustic signals transmitted to/reflected from one or more selected locations on the one or more electrochemical cells. An example sensor configuration is shown in FIG. 11 of GB application no. 2301222.2, whose subject matter is herein incorporated by reference.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An apparatus for homogenising one or more regions within a plurality of electrochemical cells, the apparatus comprising:
   a plurality of magnetic flux generators, each configured to generate a respective changing magnetic field through at least one of the plurality of electrochemical cells; and
   a controller configured to individually control each of the changing magnetic fields such that a selected one or more of the generated changing magnetic fields have a different direction and/or a different magnitude and/or a different frequency than another one or more of the generated changing magnetic fields;
   wherein the plurality of magnetic flux generators and the plurality of electrochemical cells are arranged in an alternating manner.

2. The apparatus of claim 1 wherein the apparatus comprises one or more cell stations, each configured to contain a respective plurality of the electrochemical cells.

3. The apparatus of claim 2 wherein the plurality of magnetic flux generators are arranged inside the one or more cell stations such that the one or more cell stations comprise at least one of the plurality of magnetic flux generators.

4. The apparatus of claim 3 wherein the one or more cell stations comprise at least as many of the magnetic flux generators as the electrochemical cells.

5. The apparatus of claim 4 wherein the magnetic flux generators and the electrochemical cells in the one or more cell stations are arranged in the alternating manner.

6. The apparatus of claim 2 wherein the one or more cell stations is a plurality of cell stations.

7. The apparatus of claim 6 wherein the plurality of magnetic flux generators are interspersed among the plurality of cell stations.

8. The apparatus of claim 3 wherein the one or more cell stations are contained inside a container, the container having one or more walls, and the at least one of the plurality of magnetic flux generators is arranged external to the container and adjacent to a respective one of the one or more walls of the container.

9. The apparatus of claim 1 wherein the apparatus comprises at least one electrical power source configured to supply electrical power to the plurality of electrochemical cells.

10. The apparatus of claim 9, wherein:
    the apparatus comprises one or more cell stations, each configured to contain a respective plurality of the electrochemical cells;
    the one or more cell stations is a plurality of cell stations; and
    the at least one electrical power source is a plurality of electrical power sources, each being configured to supply the electrical power to the electrochemical cells in a respective one of the plurality of cell stations.

11. The apparatus of claim 9 wherein the at least one electrical power source is further configured to supply electrical power to the plurality of magnetic flux generators.

12. The apparatus of claim 9 wherein each of the magnetic flux generators is connected to a shared power supply or a respective power supply to receive electrical power therefrom, the shared power supply or each of the respective power supplies being distinct from the at least one electrical power source.

13. The apparatus of claim 12 wherein when each of the magnetic flux generators is connected to the shared power supply, subsets of the plurality of magnetic flux generators are each connected to the shared power supply via a respective shared electrical connection.

14. The apparatus of claim 1 wherein the each of the changing magnetic fields is one of or any combination of: rotating, pulsed, and/or oscillating.

15. The apparatus of claim 1 wherein the each of the changing magnetic fields is controllably variable in one, two, or three spatial dimensions.

16. The apparatus of claim 1 wherein each of the magnetic flux generators comprises one or more magnetic field sources, wherein:
    at least one of the one or more magnetic field sources comprises a permanent magnet and a respective mechanism for moving the permanent magnet and/or one or more of the electrochemical cells;
    or at least one of the one or more magnetic field sources is an electromagnet.

17. The apparatus of claim 16 wherein the one or more magnetic field sources is a plurality of magnetic field sources arranged in a common plane.

18. The apparatus of claim 1 wherein the controller is configured to:
monitor electrochemical overpotential of each of the plurality of electrochemical cells as each of the plurality of changing magnetic fields is varied; and
select an optimal value for the each of the changing magnetic fields to minimize each of the electrochemical overpotentials.

19. A method of homogenising one or more regions within a plurality of electrochemical cells, the method comprising the steps of:
providing a plurality of magnetic flux generators;
arranging the plurality of magnetic flux generators and the plurality of electrochemical cells in an alternating manner;
generating by one or more of the plurality of magnetic flux generators a respective changing magnetic field through at least one of the plurality of electrochemical cells; and
individually controlling, via a controller, each changing magnetic field such that a selected one generated changing magnetic field has a different direction and/or a different magnitude and/or a different frequency than another generated changing magnetic field.

20. An apparatus for homogenising one or more regions within a plurality of electrochemical cells, the apparatus comprising:
a plurality of magnetic flux generators, each configured to generate a respective changing magnetic field through at least one of the plurality of electrochemical cells;
wherein the plurality of magnetic flux generators and the plurality of electrochemical cells are arranged in an alternating manner; and
wherein each of the changing magnetic fields has a frequency of at least 50 Hz.

* * * * *